United States Patent
Sendai et al.

(10) Patent No.: US 9,794,684 B2
(45) Date of Patent: Oct. 17, 2017

(54) HEAD-MOUNTED DISPLAY DEVICE, CONTROL METHOD FOR THE SAME, AND COMPUTER PROGRAM

(71) Applicant: Seiko Epson Corporation, Tokyo (JP)

(72) Inventors: Kaori Sendai, Okaya (JP); Masahide Takano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 36 days.

(21) Appl. No.: 15/016,167

(22) Filed: Feb. 4, 2016

(65) Prior Publication Data
US 2016/0238842 A1    Aug. 18, 2016

(30) Foreign Application Priority Data

Feb. 13, 2015  (JP) .................................. 2015-025930
Nov. 5, 2015   (JP) .................................. 2015-217555

(51) Int. Cl.
   *G02B 27/01*   (2006.01)
   *H04R 1/32*    (2006.01)
   *H04R 1/10*    (2006.01)

(52) U.S. Cl.
   CPC .......... *H04R 1/326* (2013.01); *G02B 27/0176* (2013.01); *H04R 1/1041* (2013.01); *G02B 2027/014* (2013.01); *G02B 2027/0138* (2013.01); *G02B 2027/0141* (2013.01); *G02B 2027/0178* (2013.01)

(58) Field of Classification Search
   CPC ........ G02B 27/0176; G02B 2027/0138; G02B 2027/0178; G02B 2027/014; G02B 2027/0141; H04R 1/326; H04R 1/1041
   See application file for complete search history.

(56) References Cited

U.S. PATENT DOCUMENTS

| 2013/0214998 A1* | 8/2013 | Andes ................. G02B 27/017 345/8 |
| 2014/0056439 A1* | 2/2014 | Kim ........................ H04R 3/00 381/92 |
| 2015/0062022 A1* | 3/2015 | Rabii ....................... G06T 1/20 345/173 |

FOREIGN PATENT DOCUMENTS

JP    2012-191624 A    10/2012

\* cited by examiner

*Primary Examiner* — Charles Hicks
(74) *Attorney, Agent, or Firm* — ALG Intellectual Property, LLC

(57) ABSTRACT

A head-mounted display device includes an image display unit which displays an image. The head-mounted display device includes: a microphone unit including an audio input unit which converts a sound into an electrical signal and capable of switching a position of the audio input unit between a plurality of positions; a position determination unit which determines which position of the plurality of positions the audio input unit is located at; and a mode switching control unit which switches an operation of the audio input unit and a display mode of the image display unit, respectively, on the basis of the determined position.

14 Claims, 15 Drawing Sheets

HEAD-MOUNTED DISPLAY DEVICE, CONTROL METHOD FOR THE SAME, AND COMPUTER PROGRAM

BACKGROUND

1. Technical Field

The present invention relates to a transmission-type head-mounted display device.

2. Related Art

According to the related art, various types of head-mounted display devices that can display an image in front of the user's eyes have been proposed. One of such head-mounted display devices has a microphone unit which is provided being adjustable in position and which gathers voices of the user, as disclosed in JP-A-2012-191624. In this head-mounted display device, since a talking operation using the microphone unit can be switched on and off according to the adjusted position of the microphone unit, operability is improved.

However, in the related-art head-mounted display device, only operability in switching on and off the talking operation can be improved. In fact, no measures have been taken to improve operability in the other main operations of the head-mounted display device. Also, improved security, power saving, compact device configurations, lower costs, resource saving, easier manufacturing and the like are demanded of the related-art head-mounted display device.

SUMMARY

An advantage of some aspects of the invention is to solve at least a part of the problems described above and the invention can be implemented as the following forms.

(1) An aspect of the invention is directed to a head-mounted display device including an image display unit which displays an image. This head-mounted display device includes: a microphone unit having an audio input unit which converts a sound into an electrical signal and capable of switching a position of the audio input unit between a plurality of positions; a position determination unit which determines which position of the plurality of positions the audio input unit is located at; and a mode switching control unit which switches an operation of the audio input unit and a display mode of the image display unit, respectively, on the basis of the determined position. According to the head-mounted display device of this configuration, the operation of the audio input unit and the display mode of the image display unit change according to the position of the audio input unit. Therefore, not only the operation using the audio input unit but also the display mode of the image display unit, which is a main operation of the head-mounted display device, can be switched. Thus, the effect of improved operability is achieved.

(2) In the head-mounted display device, the image display unit may be configured to be able to transmit outside scenery. According to this configuration, operability can be improved in a transmission-type head-mounted display device.

(3) The head-mounted display device may also include an audio output unit which outputs a sound. The mode switching control unit may also switch an operation of the audio output unit on the basis of the determined position. According to the head-mounted display device of this configuration, the operation of the audio output unit also changes according to the position of the audio input unit. Therefore, operability can be improved further.

(4) In the head-mounted display device, the mode switching control unit may switch to a talking mode in which the audio input unit and the audio output unit are each switched into an operating state so as to enable talking to outside, when the determined position is a position closest to a user's mouth, of the plurality of positions. According to the head-mounted display device of this configuration, operability in switching to the talking mode can be improved.

(5) The head-mounted display device may include a camera which shoots at least a part of outside scenery. The mode switching control unit may switch a display to a screen for shooting with the camera, as the switching of the display mode of the image display unit when in the talking mode. According to the head-mounted display device of this configuration, shooting is enabled by a simple operation during the talking mode and therefore operability can be improved further.

(6) In the head-mounted display device, the mode switching control unit may switch to a mode in which the audio output unit is switched into the operating state and in which a predetermined image is displayed on the image display unit, when the determined position is a position farthest from the user's mouth, of the plurality of positions. According to the head-mounted display device of this configuration, an image can be viewed by a simple operation and therefore operability can be improved further.

(7) In the head-mounted display device, the mode switching control unit may switch to a home mode in which the audio input unit is switched into an operating state and in which a menu screen for giving a command on an operation item corresponding to a sound acquired by the audio input unit is displayed, when the determined position is a predetermined position between the position closest to the user's mouth and the position farthest from the user's mouth, of the plurality of positions. According to the head-mounted display device of this configuration, a menu screen can be displayed by a simple operation and therefore operability can be improved further.

(8) In the head-mounted display device, the mode switching control unit may switch to a home mode in which the audio input unit is switched into an operating state and in which a menu screen for giving a command on an operation item corresponding to a sound acquired by the audio input unit is displayed, when the position determined by the position determination unit is a predetermined position. According to the head-mounted display device of this configuration, a menu screen can be displayed by a simple operation and therefore operability can be improved further.

(9) In the head-mounted display device, the mode switching control unit may display a menu screen for designating an operation related to a biological sensor, when the position determined by the position determination unit is a predetermined position. According to the head-mounted display device of this configuration, an operation related to a biological sensor can be designated via a simple configuration.

(10) In the head-mounted display device, the microphone unit may include the audio input unit connected to a distal end thereof and may have an end opposite to the audio input unit provided with an arm connected in such a way as to be able to turn at a predetermined position on a wearing section wearable on a user's head. According to the head-mounted display device of this configuration, the position of the audio input unit can be made switchable via a simple configuration.

(11) In the head-mounted display device, the microphone unit may include the audio input unit connected to a distal end thereof and may include an arm that can expand and contract in a longitudinal direction. According to the head-mounted display device of this configuration, the position of the audio input unit can be made switchable via a simple configuration.

(12) In the head-mounted display device, the image display unit may be provided in such a way as to be able to turn with respect to a wearing section wearable on a user's head. The microphone unit may be arranged at a predetermined position on the image display unit. According to the head-mounted display device of this configuration, the position of the audio input unit can be made switchable via a simple configuration.

Not all of the plurality of components in each of the above configurations of the invention is necessarily essential. In order to solve a part or all of the problems of the related-art technique or in order to achieve a part or all of the advantageous effects described in this specification, change, deletion, replacement with another component, and partial deletion of a limited content can be made according to need with respect to a part of the plurality of components. Also, in order to solve a part or all of the problems of the related-art technique or in order to achieve a part or all of the advantageous effects described in this description, apart or all of the technical features included in a configuration of the invention described above can be combined with a part or all of the technical features of another configuration of the invention described above, so as to form an independent configuration of the invention.

For example, a configuration of the invention can be materialized as a device having one or more of the four components of the image display unit, the microphone unit, the position determination unit, and the mode switching control unit. That is, this device may or may not include the image display unit. Also, the device may or may not include the microphone unit. The device may or may not include the position determination unit. The device may or may not include the mode switching control unit. The display unit may, for example, display an image. The microphone unit may, for example, include an audio input unit which converts a sound into an electrical signal and may be capable of switching the position of the audio input unit between a plurality of positions. The position determination unit may, for example, determine which position of the plurality of positions the audio input unit is located at. The mode switching control unit may, for example, switch the operation of the audio input unit and the display mode of the image display unit, respectively, on the basis of the determined position. Such a device can be materialized, for example, as a head-mounted display device but can also be materialized as devices other than the head-mounted display device. According to such configurations, at least one of various problems such as improved operability for the user, improved detection accuracy, compact device configurations, lower costs, resource saving, and easier manufacturing can be solved. A part of all of the technical features of each configuration of the head-mounted display device described above can be applied to this device.

The invention can also be implemented in various forms other than the head-mounted display device. For example, the invention can be implemented in forms such as a display device, a control method for a head-mounted display device, a control method for a display device, a head-mounted display system, a display system, a computer program for implementing the functions of a head-mounted display system, a recording medium having the computer program recorded therein, a computer program for implementing the functions of a display system, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Basic Configuration of Head-Mounted Display Device

Figure 1:
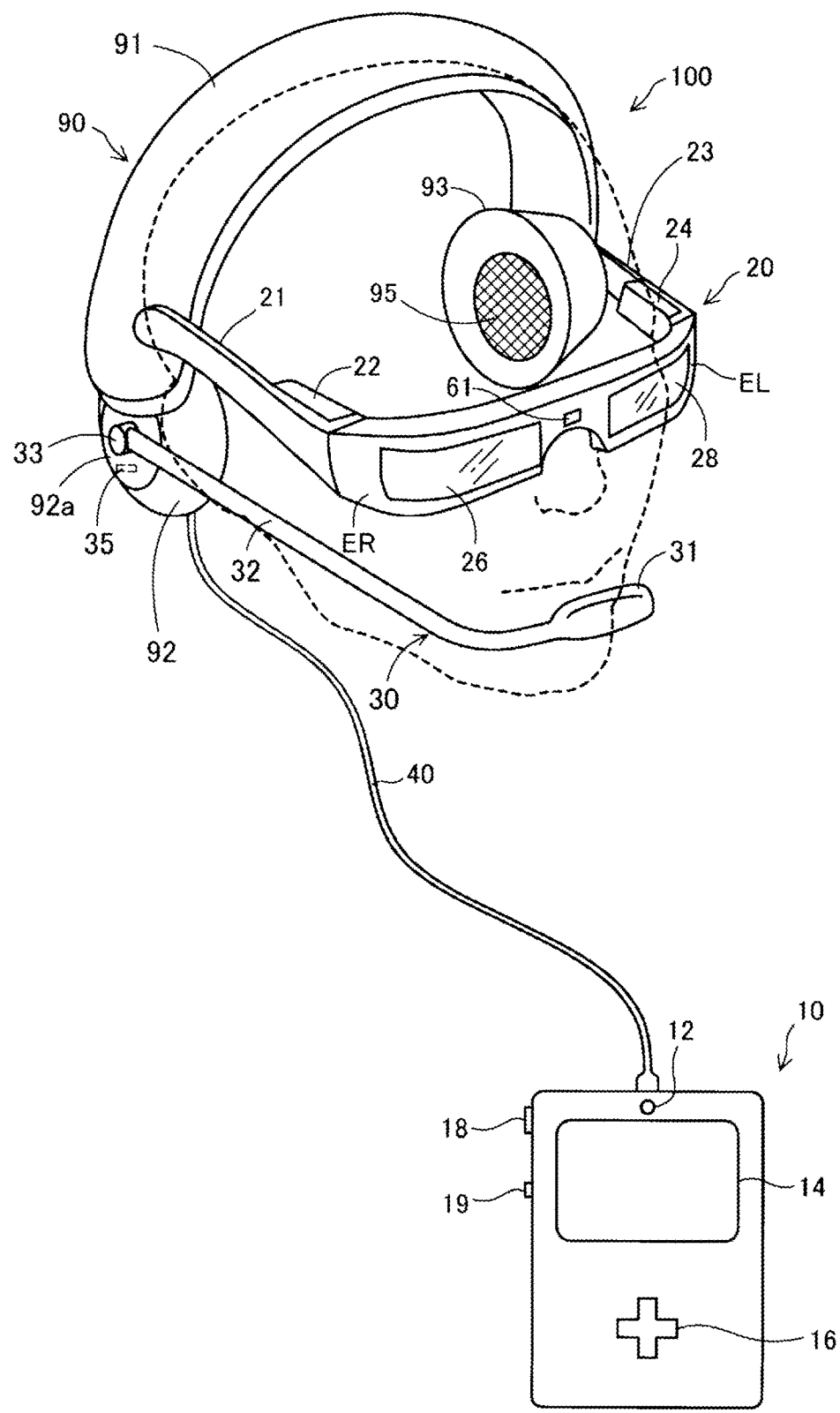
FIG. 1 is an explanatory view showing the schematic configuration of a head-mounted display device according to a first embodiment of the invention.

FIG. 1 is an explanatory view showing the schematic configuration of a head-mounted display device according to a first embodiment of the invention. A head-mounted display device 100 is a display device mounted on the head and is also called a head-mounted display (HMD). The HMD 100 is a transmission-type head-mounted display device which causes an image to appear in the external field visually recognized as it is transmitted through glasses.

The HMD 100 includes a headphone unit (wearing section) 90 wearable on the user's head, an image display unit 20 which causes the user to visually recognize a virtual image in the state where the HMD 100 is mounted on the user's head, a microphone unit 30 which acquires the user's voice in the state where the HMD 100 is mounted on the user's head, and a control unit (controller) 10 which controls the image display unit 20, the microphone unit 30 and the headphone unit 90.

The headphone unit 90 has a head band 91 curved to be mountable along the head, and right and left ear cups 92, 93 provided at both ends of the head band 91. A right acoustic channel speaker 94 (FIG. 2) is provided inside the ear cup 92 on the right-hand side. A left acoustic channel speaker 95 is provided inside the ear cup 93 on the left-hand side. On the head band 91, the image display unit 20 is attached in a fixed form.

The image display unit 20 is a mounted unit mounted on the user's head and is in the shape of eyeglasses in this embodiment. The image display unit 20 includes a right holding unit 21, a right display driving unit 22, a left holding unit 23, a left display driving unit 24, a right optical image display unit 26, and a left optical image display unit 28. The right optical image display unit 26 and the left optical image display unit 28 are situated in front of the user's right and left eyes, respectively, when the user wears the head band 91. One end of the right optical image display unit 26 and one end of the left optical image display unit 28 are connected together at a position corresponding to between the brows when the user wears the image display unit 20.

The right holding unit 21 extends substantially horizontally from an end part ER, which is the other end of the right optical image display unit 26, and is fixed near the right-hand side end of the head band 91. Similarly, the left holding unit 23 extends substantially horizontally from an end part EL, which is the other end of the left optical image display unit 28, and is fixed near the left-hand side end of the head band 91. The right holding unit 21 and the left holding unit 23 hold the right and left optical image display units 26, 28 in such a way that the right and left optical image display units 26, 28 are situated in front of the eyes of the user wearing the head band 91 on the head.

The right display driving unit 22 is arranged on the inner side of the right holding unit 21, that is, on the side facing the user's head when the user wears the image display unit 20. The left display driving unit 24 is arranged on the inner side of the left holding unit 23. Hereinafter, the right holding unit 21 and the left holding unit 23 are described as the "holding unit" without being discriminated from each other. Similarly, the right display driving unit 22 and the left display driving unit 24 are described as the "display driving unit" without being discriminated from each other. The right optical image display unit 26 and the left optical image display unit 28 are described as the "optical image display unit" without being discriminated from each other.

The display driving unit includes a liquid crystal display (hereinafter referred to as "LCD) 241, 242, a projection system 251, 252, and the like (see FIG. 2). The configuration of the display driving unit will be described in detail later. The optical image display unit as an optical member includes a light guide plate 261, 262 (see FIG. 2) and a light control plate. The light guide plate 261, 262 is formed of a light-transmitting resin material or the like and guides image light outputted from the display driving unit to the user's eyes. The light control plate is a thin plate-like optical element and is arranged to cover the front side (opposite to the side of the user's eyes) of the image display unit 20. The light control plate protects the light guide plate 261, 262 and restrains damage to and stains on the light guide plate 261, 262. Also, adjusting the light transmittance of the light control plate enables adjustment of the amount of external light entering the user's eyes and hence adjustment of visibility of the virtual image. The light control plate can be omitted.

The microphone unit 30 has a microphone 31 and an arm 32. The microphone 31 is an audio input unit which converts a sound into an electrical signal, and is connected to the distal end of the arm 32. The end of the arm 32 opposite to the microphone 31 is coupled to an upper surface 92a of the right ear cup 92 of the headphone unit 90 via a coupling part 33. This coupling allows the microphone 31 to be situated in front of the user's mouth. The coupling part 33 couples the arm 32 in such a way that the arm 32 can turn and can be fixed at an arbitrary position. Details thereof will be described later.

The unified body made up of the image display unit 20, the microphone unit 30 and the headphone unit 90 is connected to the control unit 10 via a connection cord 40. One end of the connection cord 40 is inserted into the right ear cup 92 of the headphone unit 90, then split according to need, and connected the left and right display driving unit 24, 22 of the image display unit 20, the left and right speakers 95, 94, and the microphone 31 of the microphone unit 30. The other end of the connection cord 40 is connected to the control unit 10. A connector (not shown) for connecting the connection cord 40 and the control unit 10 is provided at the end part of the connection cord 40 opposite to the right ear cup 92 and at the control unit 10. As the connector of the connection cord 40 and the connector of the control unit 10 engage with and disengage from each other, the unified body and the control unit 10 are connected to and disconnected from each other. As the connection cord 40, for example, a metal cable or optical fiber can be employed.

The control unit 10 is a device for controlling the HMD 100. The control unit 10 includes a lighting unit 12, a touch pad 14, a D-pad 16, and a power switch 18. The lighting unit 12 informs about the operation state of the HMD 100 (for example, power ON/OFF or the like) by its light emitting mode. As the lighting unit 12, for example, an LED (light emitting diode) can be used. The touch pad 14 detects a touch operation on the operation surface of the touch pad 14 and outputs a signal corresponding to the detection content. As the touch pad 14, various touch pads such as electrostatic, pressure-detection, and optical touch pads can be employed. The D-pad 16 detects a press operation on keys corresponding to up, down, left and right directions and outputs a signal corresponding to the detection content. The power switch 18 switches the state of the power supply of the HMD 100 by detecting a slide operation on the switch.

Figure 2:
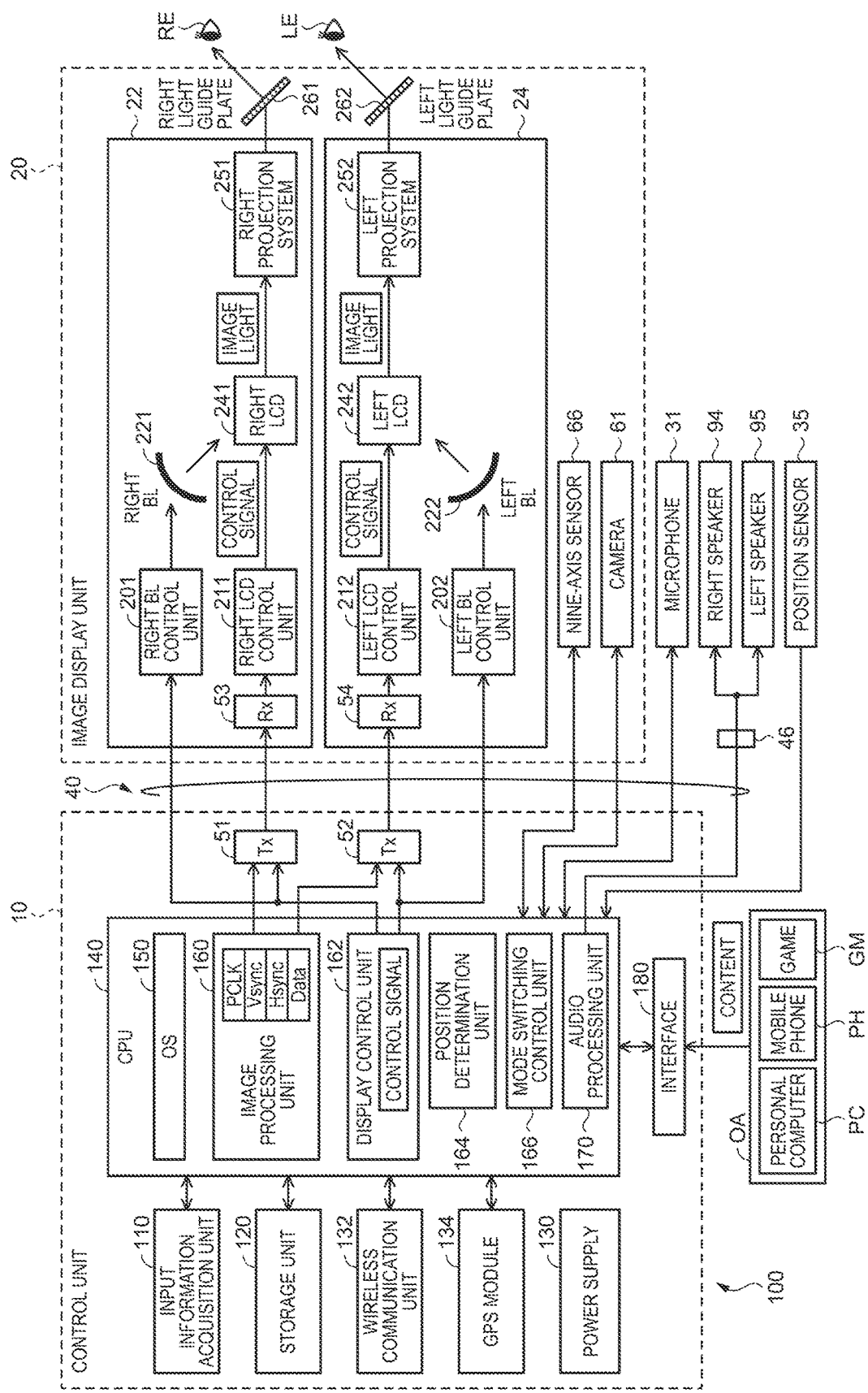
FIG. 2 is a block diagram functionally showing the configuration of the HMD.

FIG. 2 is a block diagram functionally showing the configuration of the HMD 100. The control unit 10 includes an input information acquisition unit 110, a storage unit 120, a power supply 130, a wireless communication unit 132, a GPS module 134, a CPU 140, an interface 180, and transmission units (Tx) 51 and 52. The respective parts are connected to each other via a bus, not illustrated.

The input information acquisition unit 110 acquires, for example, a signal corresponding to an operation input to the touch pad 14, the D-pad 16, the power switch 18 or the like. The storage unit 120 is made up of a ROM, RAM, DRAM, hard disk or the like.

The power supply 130 supplies electric power to each part of the HMD 100. As the power supply 130, for example, a secondary battery such as a lithium polymer battery or lithium ion battery can be used. Also, instead of the secondary battery, a primary battery or a fuel cell battery may be used, or the wireless power feeding may be received. Moreover, power feeding may be received from a solar battery and a capacitor. The wireless communication unit 132 communicates wirelessly with another device according to a predetermined wireless communication standard such as wireless LAN, Bluetooth (trademark registered), or iBeacon (trademark registered). The GPS module 134 receives signals from GPS satellites and thus detects the current position of the device itself.

The CPU 140 reads out and executes a computer program stored in the storage unit 120 and thereby functions as an operating system (OS) 150, an image processing unit 160, a display control unit 162, a position determination unit 164, a mode switching control unit 166, and an audio processing unit 170.

The image processing unit 160 generates a signal on the basis of a content (video) inputted via the interface 180 or the wireless communication unit 132. The image processing unit 160 supplies the generated signal to the image display unit 20 via the connection cord 40 and thus controls the image display unit 20. The signal to be supplied to the image display unit 20 varies between analog format and digital format. In the case of an analog format, the image processing unit 160 generates and transmits a clock signal PCLK, a vertical synchronizing signal VSync, a horizontal synchronizing signal HSync, and image data Data. Specifically, the image processing unit 160 acquires an image signal included in the content. In the case of a dynamic image, for example, the acquired image signal is an analog signal generally made up of 30 frame images per second. The image processing unit 160 separates the synchronizing signals such as the vertical synchronizing signal VSync and the horizontal synchronizing signal HSync from the acquired image signal and generates the clock signal PCLK by a PLL circuit or the like according to the periods of these synchronizing signals. The image processing unit 160 converts the analog image signal from which the synchronizing signals are separated, into a digital image signal using an A/D conversion circuit or the like. The image processing unit 160 stores the converted digital image signal, frame by frame, into the DRAM inside the storage unit 120, as the image data Data which is RGB data.

Meanwhile, in the case of a digital format, the image processing unit 160 generates and transmits a clock signal PCLK and image data Data. Specifically, if the content is in a digital format, the clock signal PCLK is outputted synchronously with the image signal. Therefore, the generation of the vertical synchronizing signal VSync and the horizontal synchronizing signal HSync and the A/D conversion of the analog image signal are not needed. The image processing unit 160 may also execute image processing such as resolution conversion processing, various kinds of color tone correction processing like adjustment of luminance and saturation, and keystone correction processing, on the image data Data stored in the storage unit 120.

The image processing unit 160 transmits the generated clock signal PCLK, vertical synchronizing signal VSync and horizontal synchronizing signal HSync, and the image data Data stored in the DRAM inside the storage unit 120, via the transmission units 51, 52. The image data Data transmitted via the transmission unit 51 is also called "right eye image data Data1", and the image data Data transmitted via the transmission unit 52 is also called "left eye image data Data2". The transmission units 51, 52 function as transceivers for serial transmission between the control unit 10 and the image display unit 20.

The display control unit 162 generates a control signal for controlling the right display driving unit 22 and the left display driving unit 24. Specifically, the display control unit 162 controls driving ON/OFF of a right LCD 241 by a right LCD control unit 211, driving ON/OFF of a right backlight 221 by a right backlight control unit 201, driving ON/OFF of a left LCD 242 by a left LCD control unit 212, driving ON/OFF of a left backlight 222 by a left backlight control unit 202, and the like, individually with a control signal, and thus controls the generation and emission of image light by each of the right display driving unit 22 and the left display driving unit 24. The display control unit 162 transmits the control signals to the right LCD control unit 211 and the left LCD control unit 212 via the transmission units 51 and 52, respectively. Similarly, the display control unit 162 transmits the control signals to the right backlight control unit 201 and the left backlight control unit 202, respectively.

The position determination unit 164 determines which position the microphone 31 of the microphone unit 30 is located at, in collaboration with a position sensor 35, described later. The mode switching control unit 166 switches the operation of the microphone 31 and the display mode of the image display unit 20 on the basis of the determined position. The configurations of the position determination unit 164 and the mode switching control unit 166 will be described in detail later.

The audio processing unit 170 acquires an audio signal included in the content, amplifies the acquired audio signal, and supplies the amplified audio signal to the speaker 94 inside the right ear cup 92 and the speaker 95 inside the left ear cup 93 connected to a coupling member 46. If, for example, the Dolby (trademark registered) system is employed, the audio signal is processed, and for example, different sounds with changed frequencies are outputted from the right and left speakers 94 and 95.

The interface 180 is an interface for connecting various external devices OA as content supply sources, to the control unit 10. The external devices OA may be, for example, a personal computer PC, mobile phone terminal PH, gaming terminal GM and the like. As the interface 180, for example, a USB interface, micro USB interface, interface for memory card or the like can be used.

The image display unit 20 has the right display driving unit 22, the left display driving unit 24, the right light guide plate 261 as the right optical image display unit 26, the left light guide plate 262 as the left optical image display unit 28, a camera 61 (see FIG. 1 as well), and a nine-axis sensor 66.

The camera 61 is an RGB camera and is arranged at a position corresponding to the user's nasal root when the user wears the image display unit 20. Therefore, the camera 61 picks up a color image of the external field in a predetermined direction of the HMD 100, that is, in the direction which the user faces in the state where the user wears the image display unit 20 on the head. The camera 61 may be a monochrome camera instead of the RGB camera.

The nine-axis sensor 66 is a motion sensor which detects acceleration (three axes), angular velocity (three axes) and geomagnetism (three axes), and is arranged at a position corresponding to between the user's brows in this embodiment. The nine-axis sensor 66 is provided in the image display unit 20 and therefore detects the movement of the user's head when the image display unit 20 is mounted on the user's head. On the basis of the detected movement of the head, the direction of the image display unit 20, that is, the user's field of view is specified.

The right display driving unit 22 includes: a receiving unit (Rx) 53; the right backlight (BL) control unit 201 and the right backlight (BL) 221 functioning as a light source; the right LCD control unit 211 and the right LCD 241 functioning as a display element; and the right projection system 251. The right backlight control unit 201, the right LCD control unit 211, the right backlight 221 and the right LCD 241 are also collectively called an "image light generation unit".

The receiving unit 53 functions as a receiver for serial transmission between the control unit 10 and the image display unit 20. The right backlight control unit 201 drives the right backlight 221 on the basis of the inputted control signal. The right backlight 221 is a light emitting body such as an LED or electroluminescence (EL), for example. The right LCD control unit 211 drives the right LCD 241 on the basis of the clock signal PCLK, the vertical synchronizing signal VSync, the horizontal synchronizing signal HSync, and the right eye image data Data1 inputted via the receiving unit 53. The right LCD 241 is a transmission-type liquid crystal panel in which a plurality of pixels is arranged in the form of a matrix. The right LCD 241 drives the liquid crystal at each pixel position arranged in the form of a matrix, thus changes the transmittance of light transmitted through the right LCD 241, and thereby modulates the illuminating light cast from the right backlight 221 into image light that is effective for presenting an image.

The right projection system 251 is made up of a collimating lens which turns the image light exiting the right LCD 241 into parallel luminous fluxes. The right light guide plate 261 as the right optical image display unit 26 guides the image light outputted from the right projection system 251 to the user's right eye RE while reflecting the image light along a predetermined optical path. The optical image display unit can use any method for forming a virtual image in front of the user's eyes with the use of image light and may use, for example, a diffraction grating or semi-transmissive reflection film. The emission of the image light by the HMD 100 is also referred to as "displaying an image" in this specification.

The left display driving unit 24 has a configuration similar to the right display driving unit 22. That is, the left display driving unit 24 includes: a receiving unit (Rx) 54; the left backlight (BL) control unit 202 and the left backlight (BL) 222 functioning as a light source; the left LCD control unit 212 and the left LCD 242 functioning as a display element; and the left projection system 252. Similarly to the right LCD 241, the left LCD 242 drives the liquid crystal at each pixel position arranged in the form of a matrix, thus changes the transmittance of light transmitted through the left LCD 242, and thereby modulates the illuminating light cast from the left backlight 222 into image light that is effective for presenting an image. While the backlight method is employed in this embodiment, the image light may be emitted using the front light method or reflection method.

The control unit 10 receives the audio signal outputted from the microphone 31 and the position signal outputted from the position sensor 35, described later, and the like, and executes various kinds of processing corresponding to these signals. The position signal from the position sensor 35 is sent to the position determination unit 164 in the control unit 10.

Figure 3:
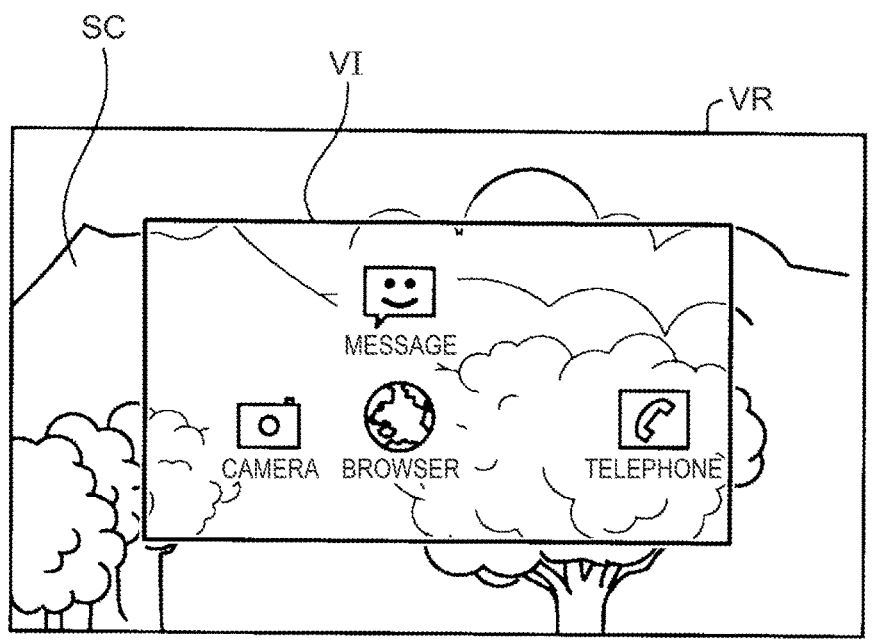
FIG. 3 is an explanatory view showing an example of an augmented reality display by the HMD.

FIG. 3 is an explanatory view showing an example of an augmented reality display by the HMD 100. In FIG. 3, an example of the user's field of view VR is shown. As image light guided to both eyes of the user of the HMD 100 as described above forms an image on the user's retinas, and thus, the user visually recognizes an image VI as augmented reality (AR). In the example of FIG. 3, the image VI is a standby screen of the OS of the HMD 100. Also, as the optical image display units 26, 28 transmit light from an external field SC, the user visually recognizes the external field SC. In this way, the user of the HMD in this embodiment can view the image VI and the external field SC behind the image VI in the part where the image VI is displayed, of the field of view VR. Meanwhile, the user can view the external field SC alone in the part where the image VI is not displayed, of the field of view VR1.

A-2. Turning of Microphone

Figure 4:
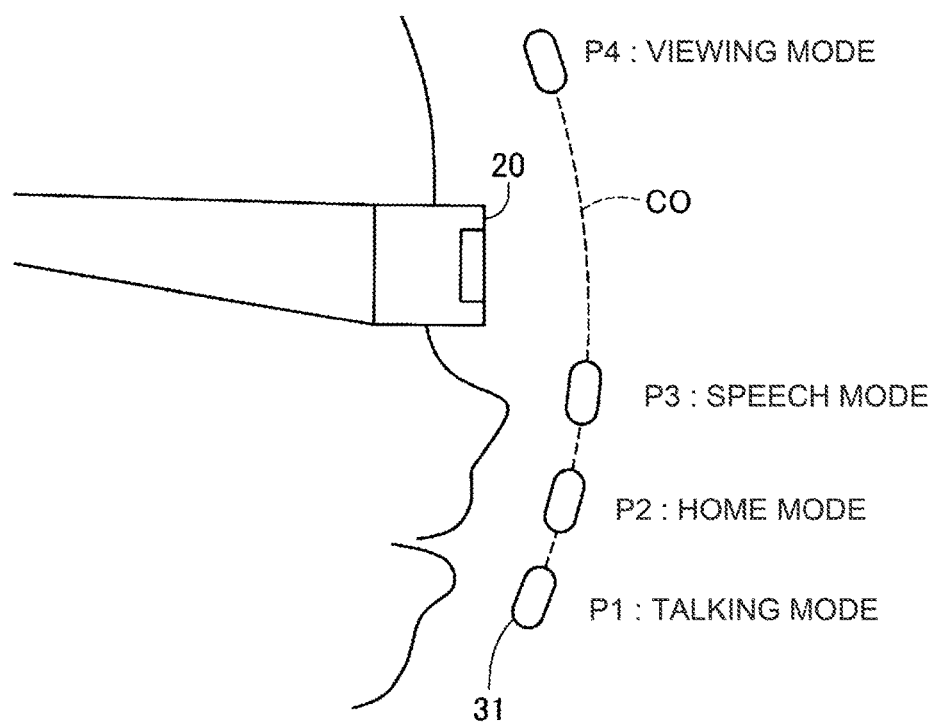
FIG. 4 is an explanatory view showing how a microphone turns.

FIG. 4 is an explanatory view showing how the microphone 31 turns. The illustration shows the image display unit 20 and the trajectory of the microphone 31, as viewed from the right-hand side. By having the arm 32 (FIG. 1) turned about the coupling part 33, the microphone 31 can move stepwise on a circular trajectory CO circling about the coupling part 33. In this embodiment, the microphone 31 can move between four positions on the circular trajectory CO, that is, first to fourth positions P1, P2, P3, and P4. This movement is made manually by the user, and mechanical measures are taken to make it easier for the microphone to stop at the respective positions P1 to P3 and harder to stop at intermediate positions between the respective positions P1 to P3. The "position" in this case refers not to the absolute position but to the relative position to a predetermined position (for example, the coupling part 33 of the arm 32) on the HMD 100, since the HMD 100 moves with the user.

The first position P1 is a position in front of the user's mouth and closest to the mouth, of the first to fourth positions P1 to P4. The third position 3 is a position slightly above the user's nose. The second position P2 is a position between the first position P1 and the third position P3. The fourth position P4 is a position in front of the user's forehead and farthest from the mouth, of the first to fourth positions P1 to P4.

As shown in FIGS. 1 and 2, the position sensor 35 is provided near the coupling part 33. On the basis of a position signal outputted from the position sensor 35, the position determination unit 164 (FIG. 2) of the control unit 10 determines which of the first to fourth positions P1 to P4 the microphone 31 is located at. In this embodiment, the position sensor 35 a rotary-type resistance potentiometer. The position sensor 35 can also be a sensor using a magnet, rotary encoder, optical sensor or the like, instead of the potentiometer. The result of the determination by the position determination unit 164 is sent to the mode switching control unit 166 (FIG. 2). The position determination unit 164 and the mode switching control unit 166 are functionally implemented by the CPU 140 executing a predetermined program stored in the storage unit 120. Details of the predetermined program will be described below.

A-3. Mode Switching Processing

Figure 5:
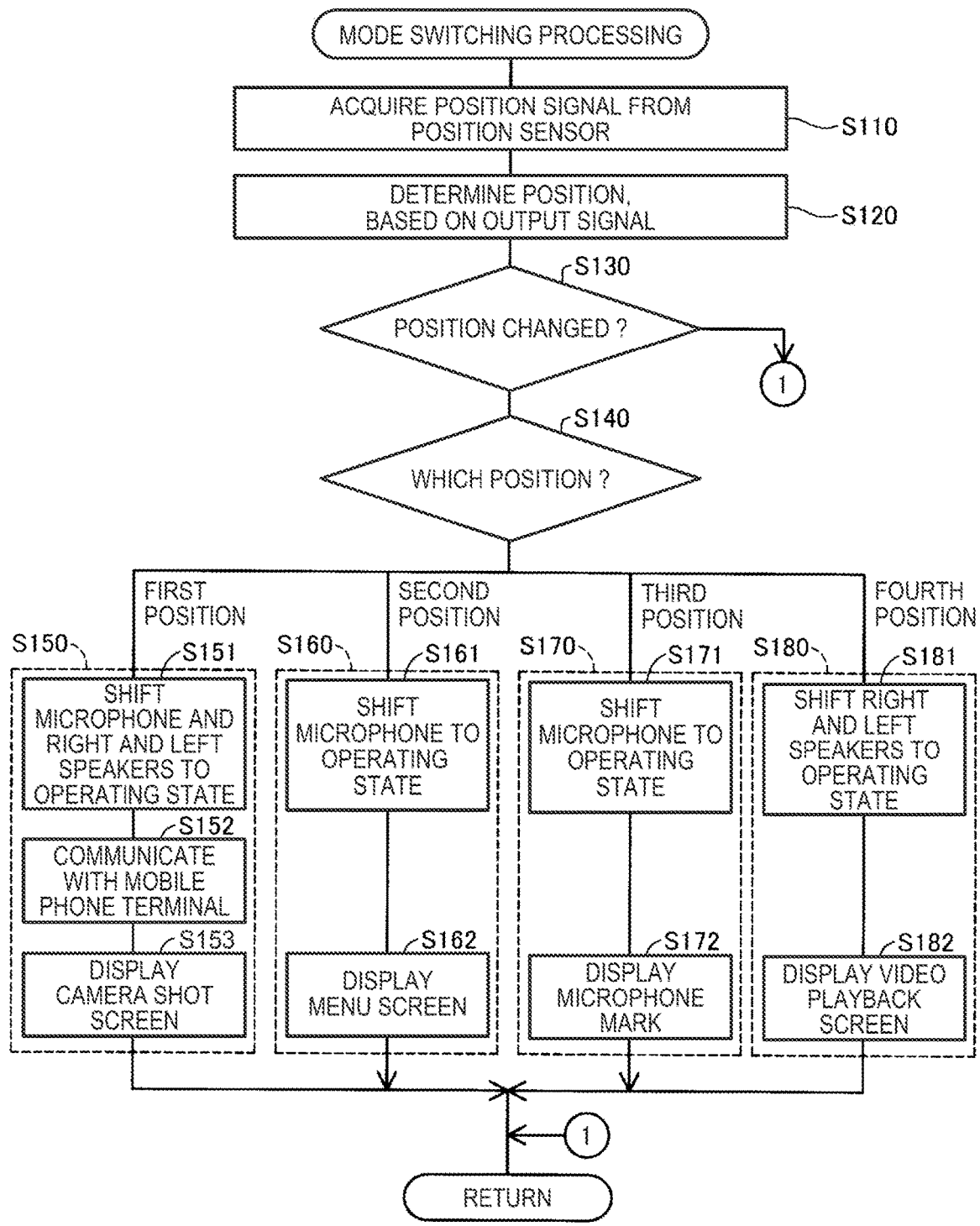
FIG. 5 is a flowchart showing the procedures of mode switching processing.

FIG. 5 is a flowchart showing procedures of mode switching processing. The mode switching processing is processing executed by the CPU 140, in which the operation of the microphone 31 and the display mode of an image as a virtual image by the image display unit 20 and the like are changed when the position of the microphone 31 of the microphone unit 30 is switched between the above-described first to fourth positions. The start trigger of this mode switching processing can be arbitrary decided. For example, the HMD 100 being started up, that is, detection of power ON may be used as the start trigger. Also, for example, a processing start request made by the OS 150 or a specific application may be used as the start trigger. The mode switching processing is repeatedly executed every predetermined time after it is started.

As illustrated, as the processing is started, the CPU 140 acquires a position signal from the position sensor 35 (Step S110). Next, the CPU 140 determines which position of the first to fourth positions P1 to P4 the microphone 31 is located at, on the basis of the position signal acquired in Step S110 (Step S120).

Subsequently, the CPU 140 determines whether or not the position determined in Step S120 is changed from the position determined the last time this mode switching was executed (Step S130). Here, if it is determined that the position is not changed, the processing jumps to "RETURN" and the mode switching processing ends temporarily.

Meanwhile, if it is determined in Step S130 that the position is changed, it is determined which of the first to fourth positions P1 to P4 the position determined in Step S120 is (Step S140).

If the result of the determination in Step S140 is the first position P1, the CPU 140 shifts the processing to a talking mode (Step S150). In the talking mode, the CPU 140 shifts the microphone 31 and the right and left speakers 94, 95 to the operating state (Step S151), then communicates with the mobile phone terminal PH (FIG. 2) via the interface 180 (FIG. 2) and switches on the power supply related to talking, in the mobile phone terminal PH (Step S152). Thus, the user can talk on the phone using the microphone 31 and the right and left speakers 94, 95 while wearing the HMD 100. Also, instead of the talking using the mobile phone terminal PH (FIG. 2), talking via various channels such as talking via a specific telephone line or talking via the internet as a telephone network may be used.

In the talking mode, the CPU 140 also causes the image display unit 20 to display a camera shot screen and thus shifts the camera 61 to a shooting standby state (step S153).

Figure 6:
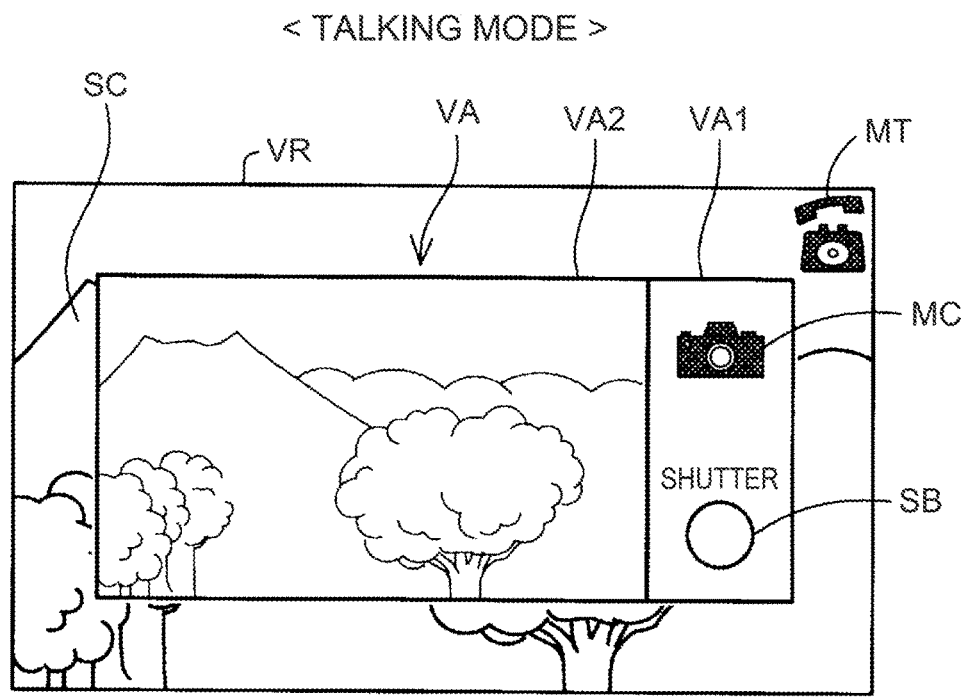
FIG. 6 is an explanatory view showing an example of a camera shot screen according to a talking mode.

FIG. 6 is an explanatory view showing an example of the camera shot screen in the talking mode. The illustration shows an example of the user's field of view VR, as in FIG. 3. In the field of view VR, a camera shot screen VA can be visually recognized as augmented reality superimposed on the external field SC. The camera shot screen VA has an operation screen part VA1 and a shot image display part VA2. The operation screen part VA1 is a part where a camera operation by the user is accepted. In this embodiment, the operation screen part VA1 has a shoot button SB for giving an instruction to execute shooting. A camera mark MC is a mark indicating that the current screen is the camera shot screen VA. The user can give an instruction to press an operation button ST by operating the touch pad 14 and the D-pad 16 of the control unit 10. Instead of the touch pad 14 and the D-pad 16, the direction of the user's line of sight may be detected by a line-of-sight direction detection unit, not shown, and an instruction to press the operation button ST may be given according to the direction of the line of sight.

In the right corner of the field of view VR, a telephone mark MT indicating that the telephone line is connected and that the telephone is in a so-called off-hook state is displayed. Thus, the user can immediately recognize that the telephone line is connected and that talking is available.

According to the talking mode, the user can talk to a third party while wearing the HMD 100, and during this talking, the user can pick up an image of the external field in the direction which the user faces, with a simple operation of the camera 61. For example, the talking mode is effective in the case where the user wants to send an image of the user's worksite so as to receive third party's guidance while working in a factory. After Step S153 of FIG. 5 is executed, the processing jumps to "RETURN" and the mode switching processing ends temporarily.

If the result of the determination in Step S140 is the second position P2 (see FIG. 4), the CPU 140 shifts the processing to a home mode (Step S160). In the home mode, the CPU 140 shifts the microphone 31 to the operating state (Step S161) and causes the image display unit 20 to display a menu screen of this application (Step S162).

Figure 7:
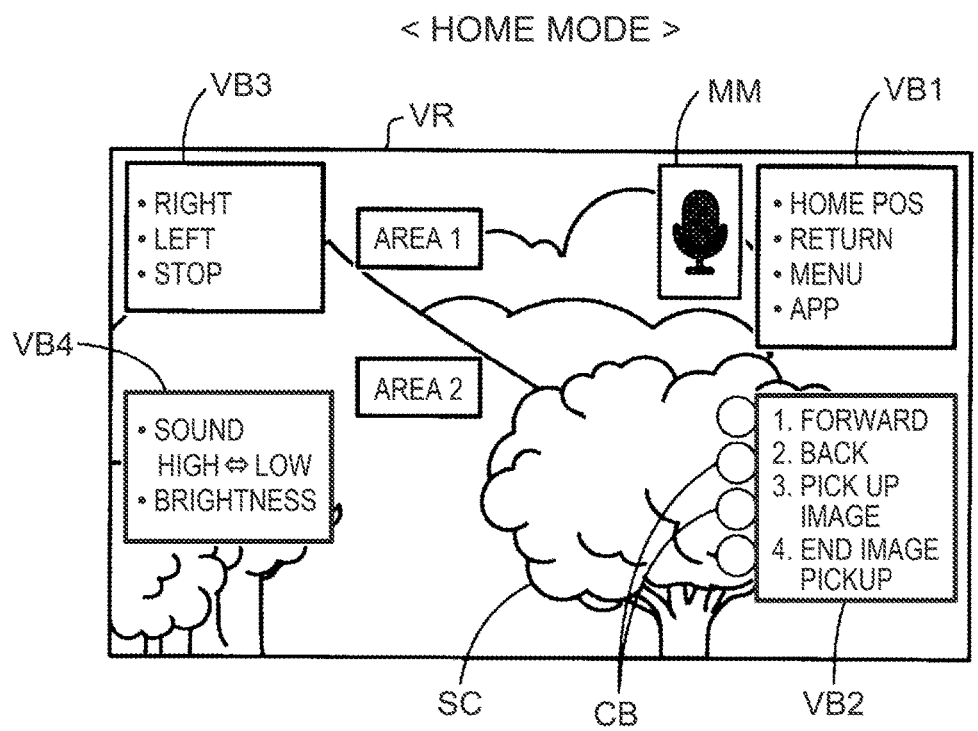
FIG. 7 is an explanatory view showing an example of a menu screen according to a home mode.

FIG. 7 is an explanatory view showing an example of the menu screen in the home mode. The illustration shows an example of the user's field of view VR, as in FIG. 3. In the field of view VR, first to fourth menu screens VB1, VB2, VB3, and VB4 can be visually recognized as augmented reality superimposed on the external field SC. The respective menu screens VB1 to VB4 show lists of operation items categorized by type, such as camera-related operations and microphone-related operations. The operator visually recognizes the operation items described in the respective menu screens VB1 to VB4 and gives a voice command on a desired operation item. The HMD 100 can gather the voice via the microphone 31, perform voice recognition of the gathered voice, and executes the command on the operation item corresponding to the result of the voice recognition.

The second operation screen VB2 has a plurality of color buttons CB. Each color bottom CB is colored. The operator can also give a command on the operation content corresponding to each color by pronouncing the color such as "red" or "yellow".

At a top right part of the field of view VR, a microphone mark MM indicating that voice recognition is under way is displayed. Thus, the user learns that the user can give a voice command on the operation items in the visually recognized menu screens VB1 to VB4. After Step S153 of FIG. 5 is executed, the processing jumps to "RETURN" and the mode switching processing ends temporarily.

If the result of the determination in Step S140 of FIG. 5 is the third position P3 (see FIG. 4), the CPU 140 shifts the processing to a speech mode (Step S170). In the speech mode, the CPU 140 shifts the microphone 31 to the operating state (Step S171) and causes the image display unit 20 to display a microphone mark (Step S172).

Figure 8:
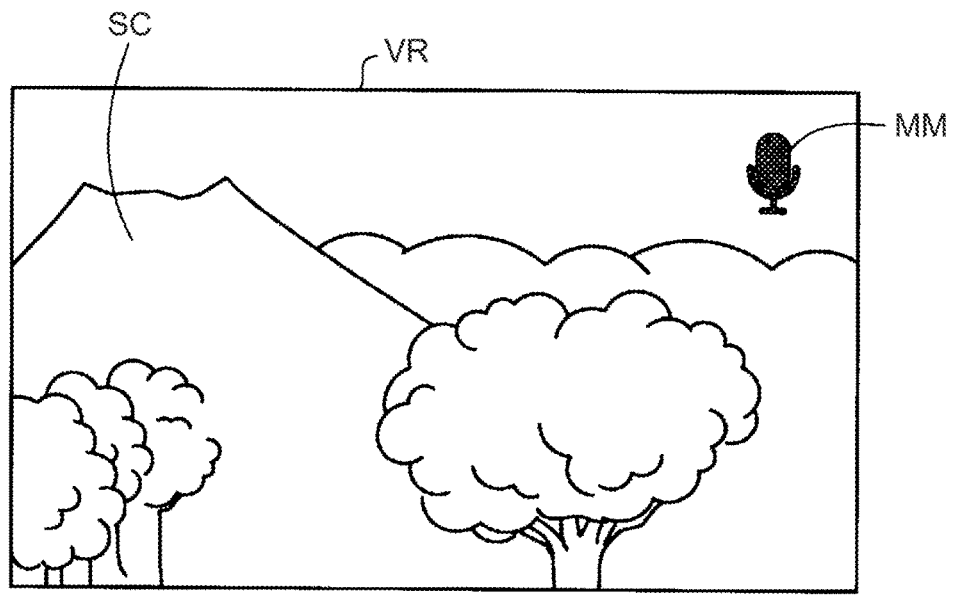
FIG. 8 is an explanatory view showing an example of a microphone mark according to a speech mode.

FIG. 8 is an explanatory view showing an example of the microphone mark in the speech mode. The illustration shows an example of the user's field of view VR, as in FIG. 3. In the field of view VR, a microphone mark MM indicating the microphone can be visually recognized as augmented reality superimposed on the external field SC. The operator can learn that the microphone 31 is in the operating state by visually recognizing the microphone mark MM. This is effective in the case where the user gives a voice command to a third person working in a factory. After Step S153 of FIG. 5 is executed, the processing jumps to "RETURN" and the mode switching processing ends temporarily.

If the result of the determination in Step S140 of FIG. 5 is the fourth position P4 (see FIG. 4), the CPU 140 shifts the processing to a viewing mode (Step 180). In the viewing mode, the CPU 140 shifts the right and left speakers 94, 95 to the operating state (Step S181) and causes the image display unit 20 to display a video playback screen (Step S182).

Figure 9:
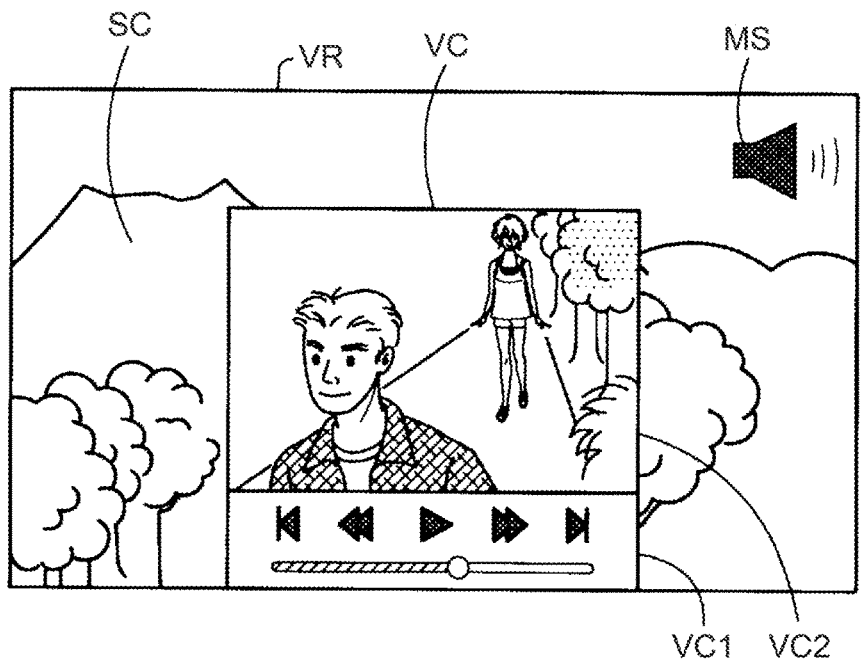
FIG. 9 is an explanatory view showing an example of a video playback screen according to a viewing mode.

FIG. 9 is an explanatory view showing an example of the video playback screen in the viewing mode. The illustration shows an example of the user's field of view VR, as in FIG. 3. In the field of view VR, a video playback screen VC can be visually recognized as augmented reality superimposed on the external field SC. The video playback screen VC has an operation screen part VC1 and a video display part VC2. The operation screen part VC1 is a part where an operation by the user is accepted and various buttons for giving instructions to execute video playback are provided. In the video display part VC2, the played-back video is displayed. The user can give an instruction to press a button in the operation screen part VC1 by operating the touch pad 14 and the D-pad 16 of the control unit 10. Instead of the touch pad 14 and the D-pad 16, the direction of the user's line of sight may be detected by a line-of-sight direction detection unit, not shown, and an instruction to press each button may be given according to the direction of the line of sight.

In atop right part of the field of view VR, a speaker mark MS indicating that the viewing is under way is displayed. According to the viewing mode, the user can play back a video with a simple operation. As a modification of this embodiment, a web mode for carrying out web search may be used instead of the viewing mode. In the web mode, the processing of Step S182 is configured to display a web browser screen on the image display unit 20. Moreover, a predetermined image may be displayed instead of the video playback and web browser. Back to FIG. 5, after Step S153 is executed, the processing jumps to "RETURN" and the mode switching processing ends temporarily.

In the mode switching processing, the functions of the CPU 140 executing the processing of Steps S110 and S120 correspond to the position determination unit 164 (FIG. 2), and the functions of the CPU 140 executing the processing of Steps S130 to S182 correspond to the mode switching control unit 166 (FIG. 2).

In this embodiment, the user uses the home mode in the second position P2 as the basic position of the microphone 31. When talking, the user lowers the arm 32 to switch the microphone 31 to the first position P1. When making a speech, the user raises the arm 32 by one stage from the basic position and thus switches the microphone 31 to the third position P3. When viewing, the user raises the arm 32 by two stages from the basic position and thus switches the microphone 31 to the fourth position P4.

According to the HMD 100 of the first embodiment configured as described above, the operation of the microphone 31 and the display screen on the image display unit 20 are switched according to the position of the microphone 31 of the microphone unit 30. The display screen functions as a GUI (graphical user interface). Therefore, not only the operation using the microphone but also display mode of the image display unit 20, which is a main operation of the HMD 100, can be switched. Thus, the effect of being able to improve operability is achieved.

B. Second Embodiment

Next, a second embodiment of the invention will be described. The HMD of the second embodiment is different from the HMD 100 of the first embodiment in that a wireless earphone microphone is provided instead of the headphone unit 90 and the microphone unit 30. The other parts of the configuration are the same. The same parts are denoted by the same reference numbers as in the first embodiment and will not be described further. That is, the HMD of the second embodiment has a control unit 10, an image display unit 20, and a wireless earphone microphone. While the image display unit 20 in the first embodiment is attached in the form of being fixed to the head band 91 of the headphone unit 90, the image display unit 20 in the second embodiment is held on the user's head with the right holding unit 21 and the left holding unit 23 serving as the temples of eyeglasses.

Figure 10:
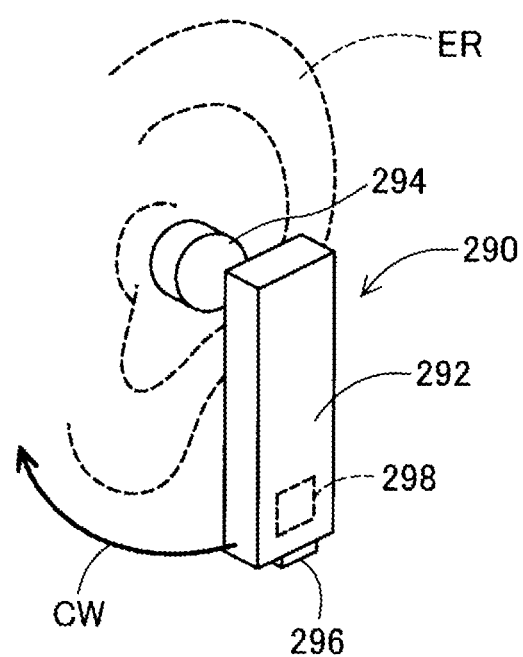
FIG. 10 is an explanatory view showing a wireless earphone microphone according to a second embodiment of the invention.

FIG. 10 is an explanatory view showing a wireless earphone microphone 290. The wireless earphone microphone 290 has a box-shaped main body unit 292 and an earpiece unit 294. The earpiece unit 294 is provided standing on a lateral side on one end side in the longitudinal direction of the main body unit 292 and has a built-in audio output unit. At the tip on the other end side in the longitudinal direction of the main body unit 292, a microphone 296 as an audio input unit is provided. The wireless earphone microphone 290 communicates wirelessly with the control unit 10 via Bluetooth (trademark registered). Instead of Bluetooth, iBeacon (trademark registered) or wireless LAN or the like may be used.

The user wears the wireless earphone microphone 290 by inserting the earpiece unit 294 into the hole of the ear ER. While the wireless earphone microphone 290 in the illustration is worn with its longitudinal direction coinciding with the vertical direction, the user can turn the wireless earphone microphone 290 about the earpiece unit 294 as its axis, in the state of wearing the wireless earphone microphone 290. Therefore, in the second embodiment, the microphone 296 can move between positions on a circular trajectory CW about the earpiece unit 294 as its axis, as in the first embodiment.

A six-axis sensor 298 is provided in the main body unit 292. The direction in which the longitudinal direction of the wireless earphone microphone 290 faces can be detected by the six-axis sensor 298. The direction detected by the six-axis sensor 298 is sent to the control unit 10 via wireless communication. The control unit 10 determines the position of the microphone 296 on the basis of the direction detected by the six-axis sensor 298 and performs processing similar to the mode switching processing in the first embodiment (FIG. 5), thus switching the operation of the microphone 296 and the display mode of the image display unit 20, respectively, on the basis of the position of the microphone 296.

According to the HMD of the second embodiment configured as described above, not only the operation using the microphone but also the display mode of the image display unit 20 can be switched, as in the first embodiment. Therefore, the effect of being able of improve operability is achieved, as in the first embodiment.

C. Third Embodiment

Figure 11:
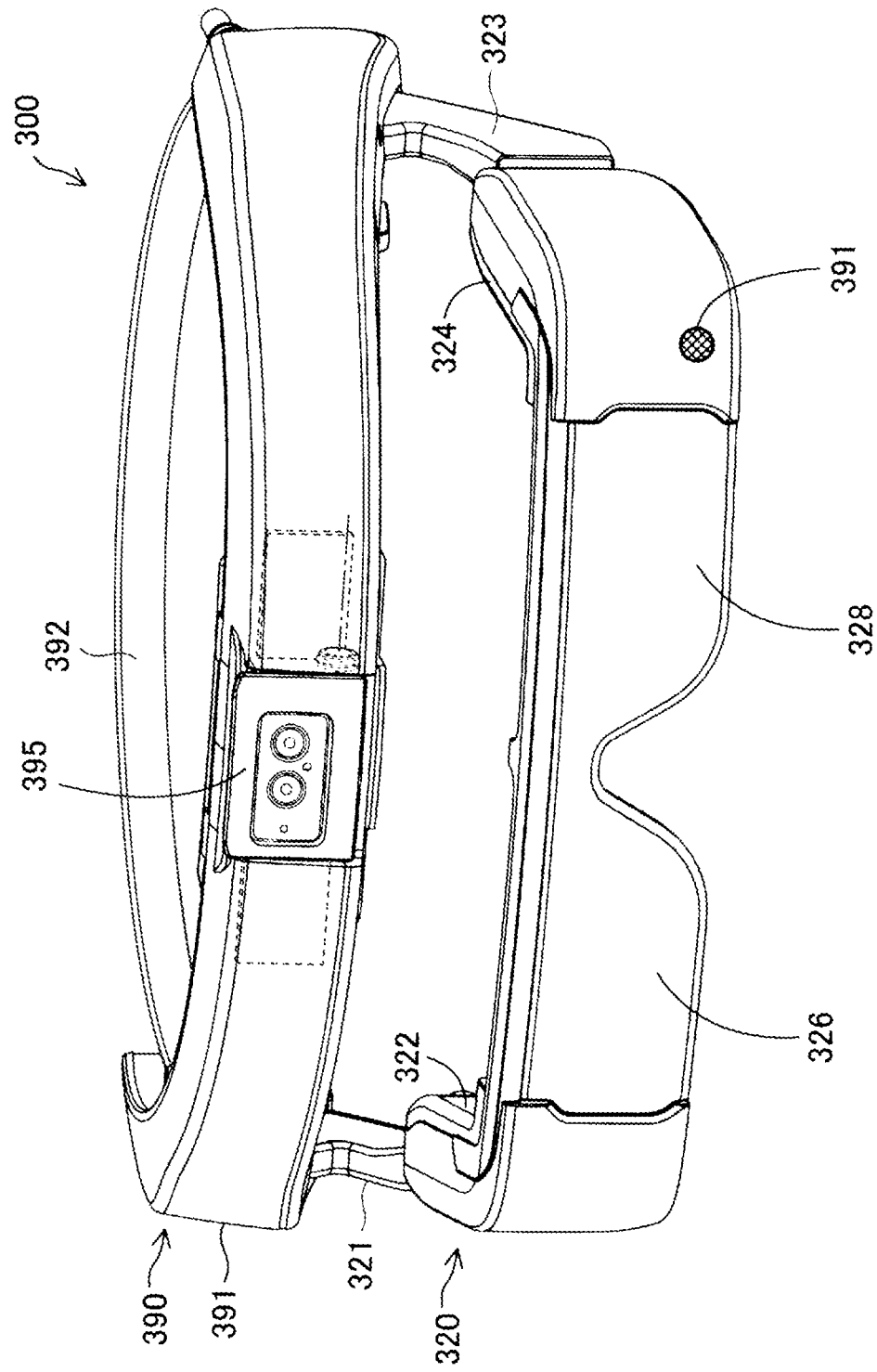
FIG. 11 is an explanatory view showing the schematic configuration of an HMD according to a third embodiment of the invention.

FIG. 11 is an explanatory view showing the schematic configuration of an HMD in a third embodiment of the invention. The HMD 300 in the third embodiment has a wearing band 390 wearable on the user's head, an image display unit 320, and a control unit (not illustrated).

The wearing band 390 has a wearing base section 391 made of a resin, and a belt section 392 made of a cloth and coupled to the wearing base section 391. The wearing base section 391 has a curved shape corresponding to the shape of a human forehead and is worn around the user's head with the belt section 392. A stereo camera 395 is provided in a front part of the wearing band 390. The stereo camera 395 is in place of the camera 61 in the first embodiment (FIG. 1) and picks up an image of the external field in the direction which the user faces.

The image display unit 320 includes a right holding unit 321, a right display driving unit 322, a left holding unit 323, a left display driving unit 324, a right optical image display unit 326, and a left optical image display unit 328. The respective units 321 to 328 have the same functions as the right holding unit 21, the right display driving unit 22, the left holding unit 23, the left display driving unit 24, the right optical image display unit 26 and the left optical image display unit 28 in the first embodiment. The left holding unit 323 and the right optical image display unit 326 are coupled respectively to the wearing base section 391 in such a way as to be able to turn. Consequently, the image display unit 320 can turn in front of the user's eyes. How the image display unit 320 turns will be described later.

A nine-axis sensor, not illustrated, is provided in the image display unit 320. This nine-axis sensor has the same functions as the nine-axis sensor 66 in the first embodiment (FIG. 2). A microphone 331 is provided in the frame part on the left-hand side of the left optical image display unit 328 of the image display unit 320. The microphone 331 functions as an audio input unit which converts a sound into an electrical signal, similarly to the microphone 31 in the first embodiment (FIG. 1).

The control unit, not illustrated, has substantially the same functions as the control unit 10 in the first embodiment. The HMD 300 of this embodiment also has earphones (not illustrated). The earphones are stereo earphones having an audio output unit inside each of left and right earpieces and are connected to the control unit. The earphones are in place of the right and left speakers 94, 95 in the first embodiment.

Figure 12:
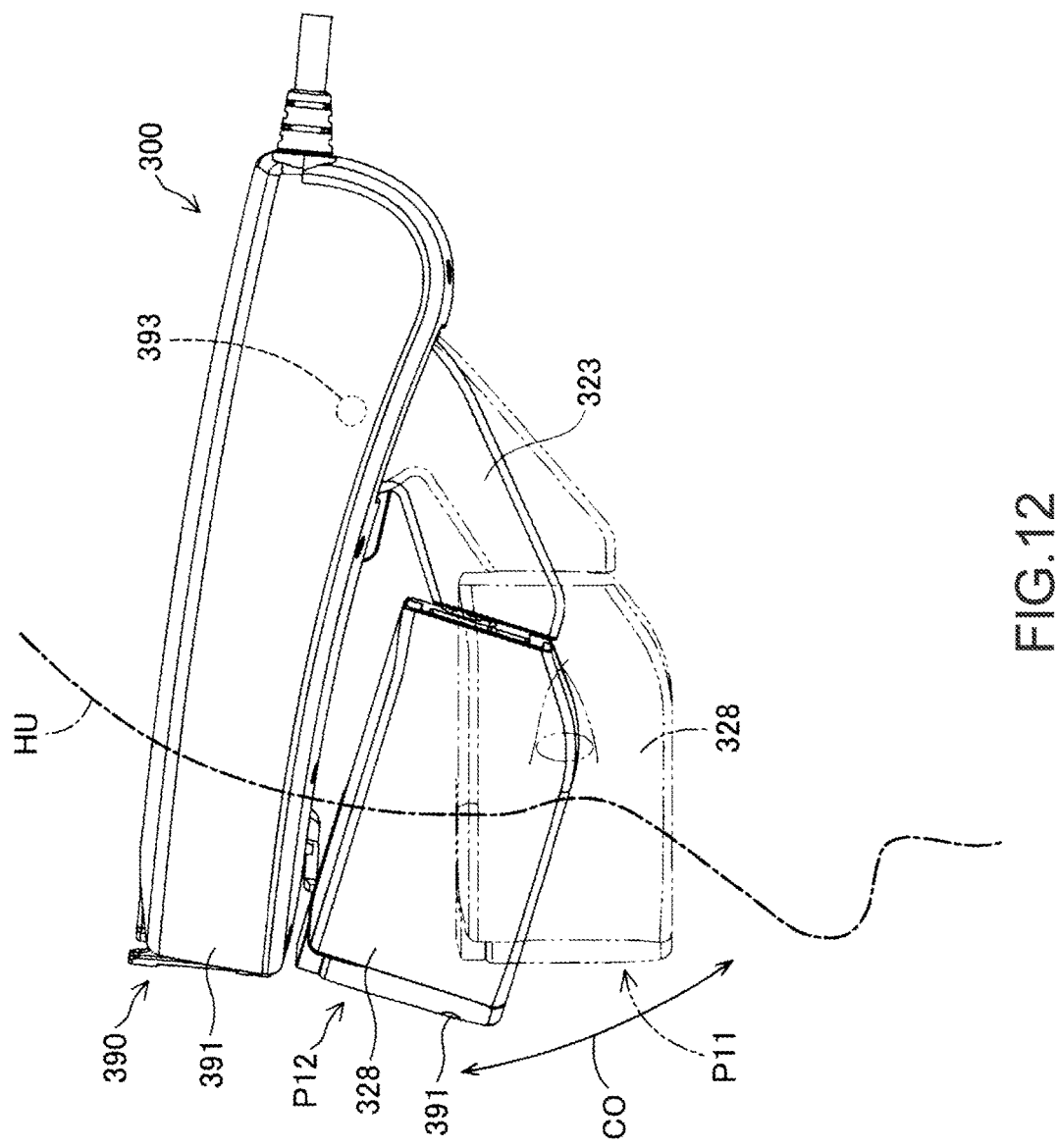
FIG. 12 is an explanatory view showing how an image display unit turns.

FIG. 12 is an explanatory view showing how the image display unit 320 turns. In FIG. 12, only the left optical image display unit 328, of the optical image display units, is shown, and only the configuration on the left-hand side is shown as a representative. The configuration on the right-hand side is similar to that on the left-hand side. The left holding unit 323 is coupled to the wearing base section 391 via a coupling part 393. The coupling part 393 couples the optical image display unit 328 in such a state that the optical image display unit 328 is movable to an arbitrary position (turning position) from a first position P11 to a second position P12 (the highest position that the optical image display unit 328 can be pushed up to) on a circular trajectory CO about the coupling part 393. This movement is made manually by the user and can be made in the state where the user wears the device on the head. The optical image display unit 328 that is moved is in the state of being fixed at the arbitrary position. The first position P11 is the position where the optical image display unit 328 is arranged in front of the eyes of the user HU.

The turning position of the optical image display units 326, 328 on the circular trajectory CO can be detected by an angle sensor (not illustrated). In this embodiment, the angle sensor is a rotary-type resistance potentiometer. The angle sensor may also be a sensor using a magnet, rotary encoder, optical sensor or the like, instead of the potentiometer. In this embodiment, the control unit determines which of the first position P11, a position between the first position P11 and the second position P12, and the second position P12, the optical image display unit 328 is located at, on the basis of the detection value from the angle sensor.

Figure 13:
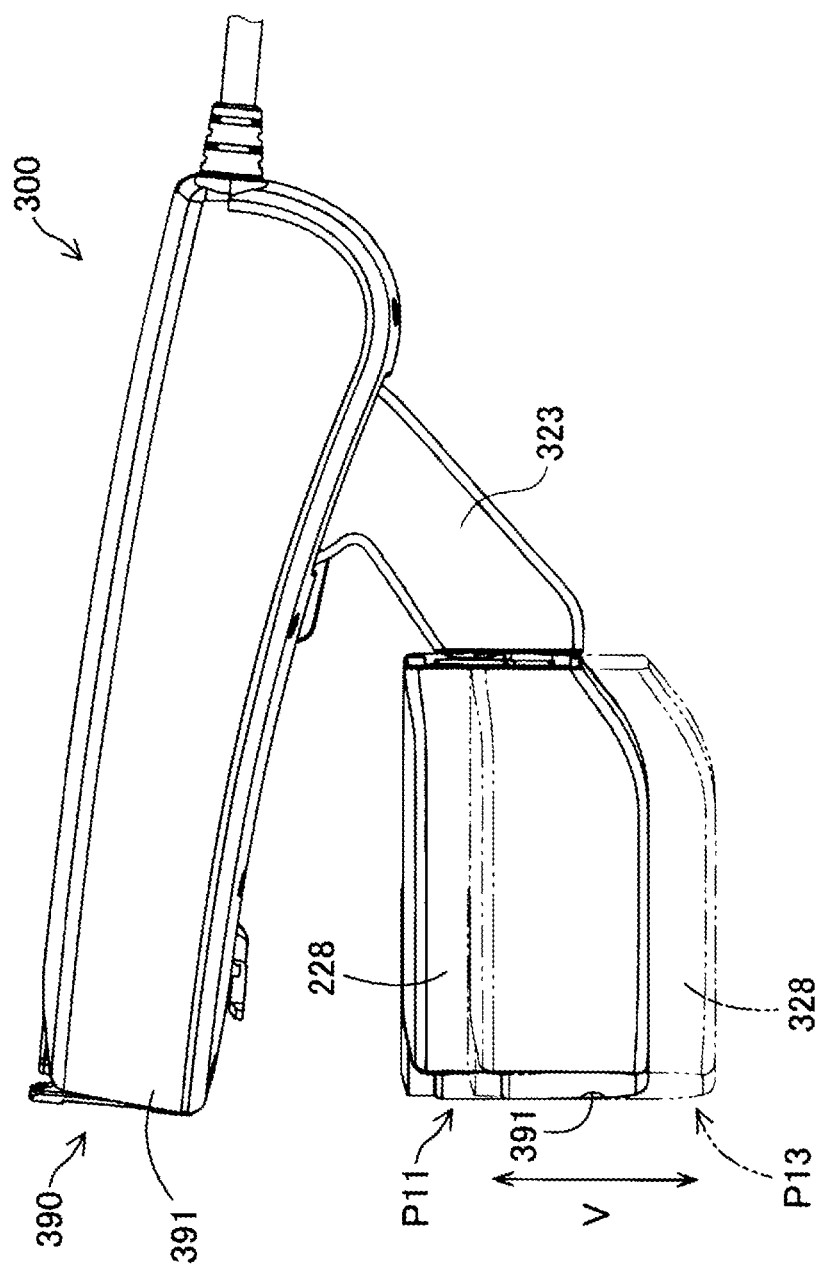
FIG. 13 is an explanatory view showing how the image display unit slides.

FIG. 13 is an explanatory view showing how the image display unit 320 slides. As described above, the image display unit 320 turns. Moreover, in the HMD 300 of this embodiment, the image display unit 320 is configured to be able to move in an up-down direction. More specifically, the right and left optical image display units 326, 328 can slide in an up-down direction V with respect to the right and left holding units 321, 323. The "up-down direction V" in this case is a direction along the display surfaces of the optical image display units 326, 328 and is vertical when the image display unit 320 is at the first position P11.

Figure 14:
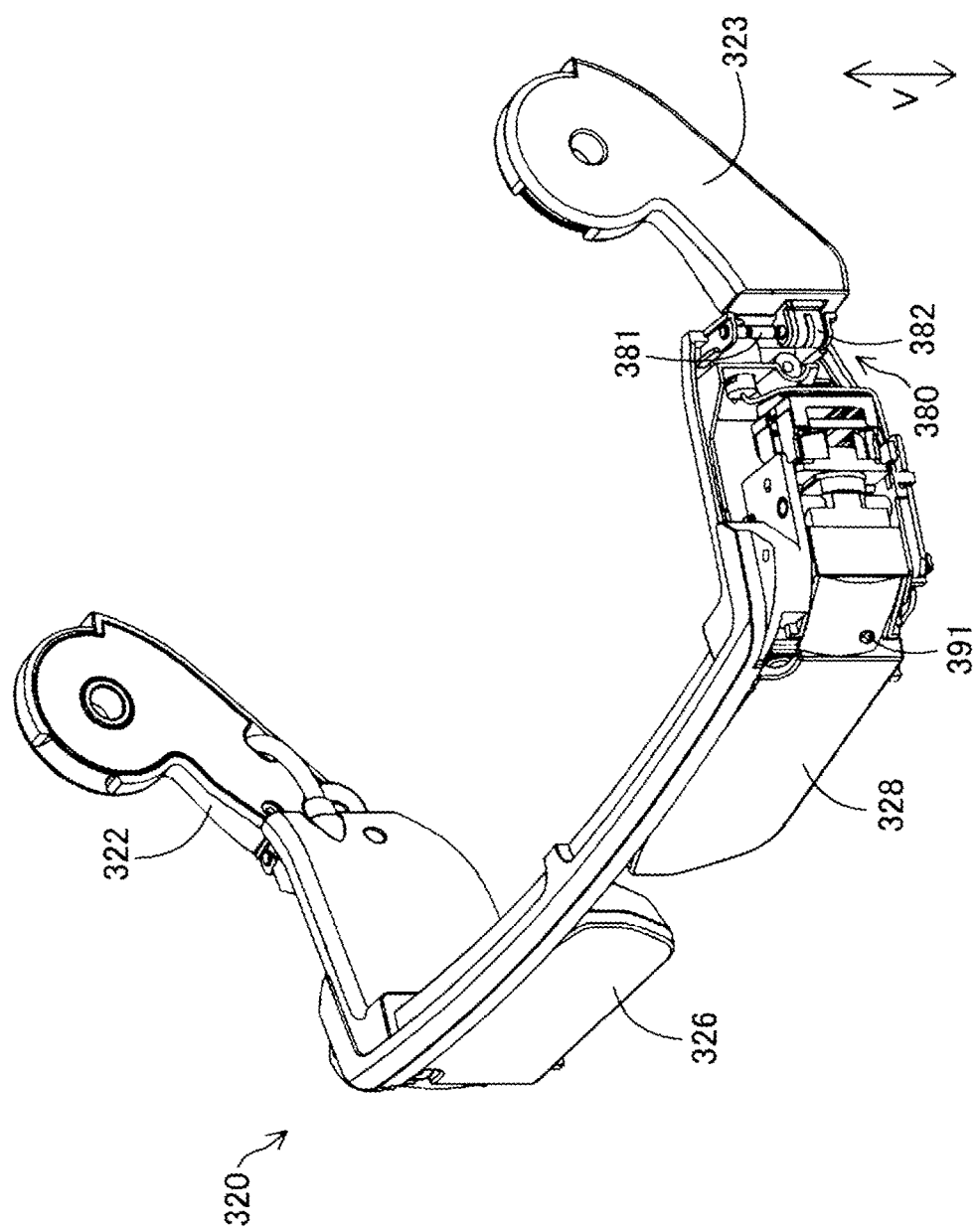
FIG. 14 is a perspective view showing the internal configuration near an end part EL of a left optical image display unit.

FIG. 14 is a perspective view showing the internal configuration near the end part EL of the left optical image display unit 328. While the internal configuration near the end part EL of the left optical image display unit 328 is shown in FIG. 14, the configuration on the right-hand side is similar to that on the left-hand side. The movement in the up-down direction V is achieved by a slide mechanism 380 arranged inside near the end part of the left optical image display unit 328.

The slide mechanism 380 has a guide rail 381 and the slide member 382. The guide rail 381 is a rod-like member and is connected to the side of the left optical image display unit 328. The slide member 382 is connected to the left holding unit 323 and has the guide rail 381 inserted therein. Although the detailed internal configuration of the slide member 382 is not described, the slide member 382 is configured to be able to move stepwise along the guide rail 381. A displacement sensor, not illustrated, is provided in the slide mechanism 380 and can detect the position of the slide member 382 in relation to the guide rail 381. As the displacement sensor, various types of sensors such as an optical sensor, magnetic sensor or ultrasonic sensor can be used.

By the operation of the slide mechanism 380, the right and left optical image display units 326, 328 can slide in the up-down direction V with respect to the right and left holding units 321, 323. That is, the right and left optical image display units 326, 328 can move (slide) to an arbitrary position from the first position P11 to a third position P13. This slide movement is made manually by the user. In this embodiment, the control unit determines which of the first position P11 and the third position P13 the optical image display unit 328 is located at, on the basis of the detection value from the displacement sensor. That is, the control unit can determine which of the first position P11, a position between the first position P11 and the second position P12, the second position P12, and the third position 13 (four positions in total), the optical image display unit is located at, on the basis of the detection value from the angle sensor and the detection value from the displacement sensor.

The four positions are positions between which the position of the image display unit 320 can be switched. Also, the microphone 331 is provided on the image display unit 320. Therefore, the four positions can also be said to be positions between which the position of the microphone 331 can be switched. The "position of the microphone 331" is the relative position to a predetermined position on the HMD 300 (for example, the stereo camera 395). In this embodiment, the control unit executes mode switching processing similar to the first embodiment (FIG. 5), using the first to fourth positions P1 to P4 in the first embodiment as the four positions.

According to the HMD 300 of the third embodiment configured as described above, the position of the microphone 331 can be switched by the operation of turning or sliding the image display unit 320, and the operation of the microphone 331 and the display screen on the image display unit 320 change according to the position of the microphone 331, as in the first embodiment. Therefore, according to the HMD 300, not only the operation using the microphone 331 but also the display mode of the image display unit 320 can be switched and operability can be improved, as in the first embodiment.

D. Fourth Embodiment

Figure 15:
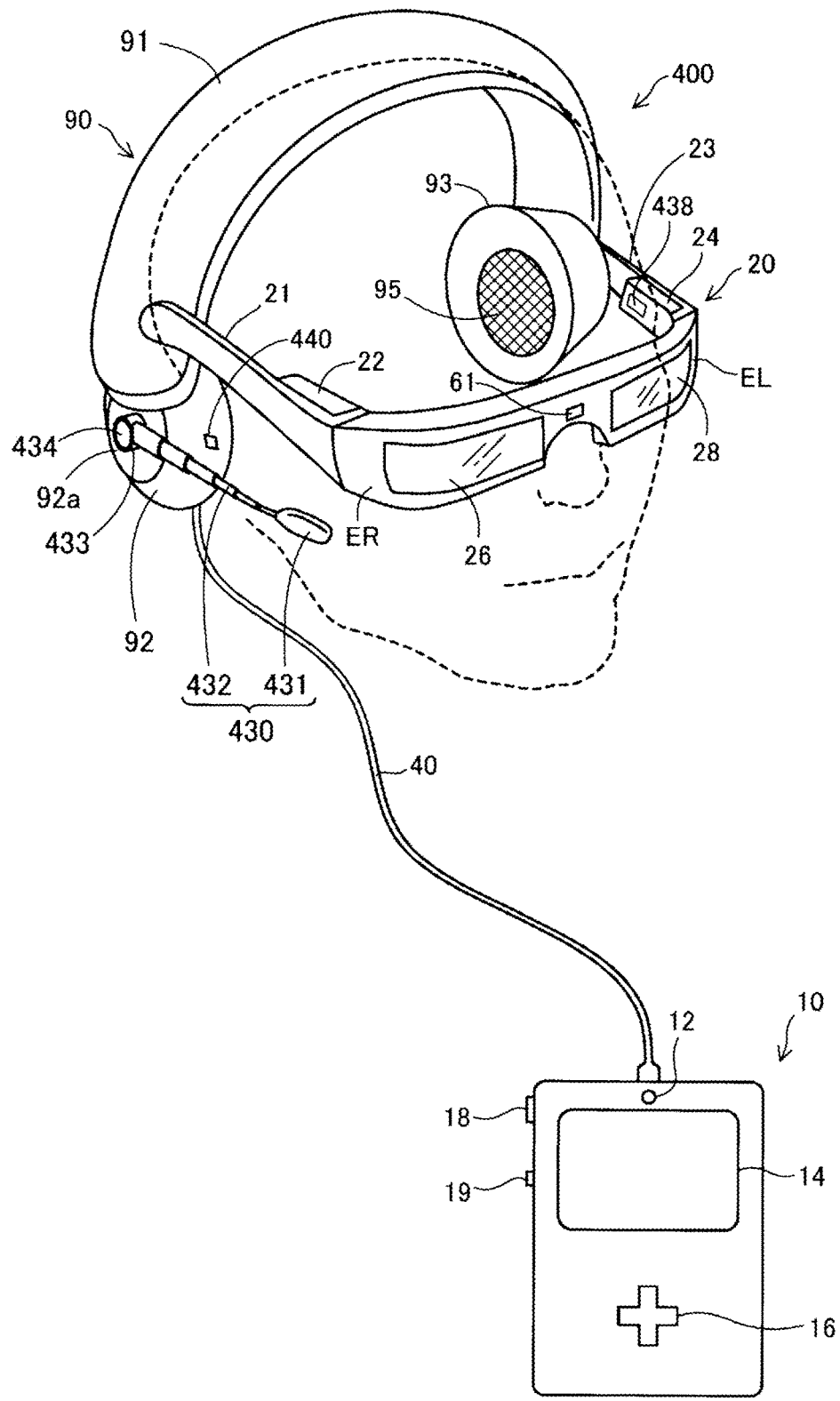
FIG. 15 is an explanatory view showing the schematic configuration of an HMD according to a fourth embodiment of the invention.

FIG. 15 is an explanatory view showing the schematic configuration of an HMD according to a fourth embodiment of the invention. An HMD 400 according to the fourth embodiment is different from the HMD 100 of the first embodiment in the configuration of a microphone unit 430. The microphone unit 430 is similar to the microphone unit 30 in the first embodiment in that a microphone 431 is connected to the distal end of an arm 432, but different in that the arm 432 can expand and contract. The arm 432 has a structure in which a plurality of rod-like parts with different inner diameters is connected together in a telescopic form. The inner diameter becomes smaller toward the microphone 431. With this structure, the user can expand and the contract the arm 432 in a straight direction (longitudinal direction of the arm), holding the microphone 431.

The end part of the arm 432 opposite to the microphone 431 is coupled via a coupling part 433 to the upper surface 92a of the right ear cup 92 of the image display unit 20. Unlike the first embodiment, the coupling part 433 fixes the arm 432 in a state of being unable to turn. Also, an arm shooting camera 440 is provided at a predetermined position on the lateral side of the right ear cup 92. The arm shooting camera 440 shoots the arm 432.

A mute button 434 is provided at the distal end on the outer side of the coupling part 433. The mute button 434 is a press button-type switch which is switched on and off in response to an operation by the user, and has the function of temporarily stopping the output of sounds from the speakers 94, 95. The hardware configuration other than the above description in the HMD 400 is the same as that of the HMD 100 of the first embodiment. Therefore, the same components are denoted in FIG. 15 by the same reference numbers as in FIG. 1 and will not be described further in detail.

The control unit 10 in this embodiment finds the total length of the expanded arm 432 on the basis of the image shot by the arm shooting camera 440 and determines which of the first to fourth positions the microphone 431 is located at, on the basis of the total length found. More specifically, the position of the microphone 431 where the total length is at its maximum is determined as the first position, and the position of the microphone 431 where the total length is at its minimum is determined as the fourth position. If the total length is closer to the maximum, between the maximum length and the minimum length, the position is determined as the second position. If the total length is closer to the minimum, between the maximum length and the minimum length, the position is determined as the third position. After that, the control unit 10 executes the processing of Step S130 and onward in the mode switching processing of FIG. 5.

In this embodiment, the configuration in which the arm 432 is shot by the arm shooting camera 440 is employed. However, instead of this, the microphone 431 may be shot. Moreover, instead of the configuration in which the position of the microphone 431 is determined on the basis of the camera shot image, the length of the arm 432 may be measured by various displacement sensors or length measuring sensor, and the position of the microphone 431 may be determined on the basis of the result of the determination.

According to the HMD 400 of the fourth embodiment configured as described above, the position of the microphone 431 can be switched by the operation of expanding and contracting the arm 432 of the microphone unit 430, and operation of the microphone 431 and the display screen on the image display unit 20 change according to the position of the microphone 431, as in the first embodiment. Therefore, according to the HMD 400, not only the operation using the microphone 431 but also the display mode of the image display unit 20 can be switched and operability can be improved, as in the first embodiment. Also, in this embodiment, since the mute button 434 is provided, muting can be performed by a quick operation in a mode in which a sound is outputted, such as in the viewing mode.

Moreover, as a modification of this embodiment, a biological sensor 438 (FIG. 15) may be provided on the surface of the inner side of the left display driving unit 24. The biological sensor 438 contacts the user's temple and detects cardiac sound, body temperature, pulse rate, heartbeat and the like when the user wears the HMD 400. In this modification, the result of the detection by the biological sensor 438 is displayed in the home mode and the viewing mode. With this configuration, the result of the detection by the biological sensor 438 can be displayed according to the position of the microphone 431.

E. Fifth Embodiment

Figure 16:
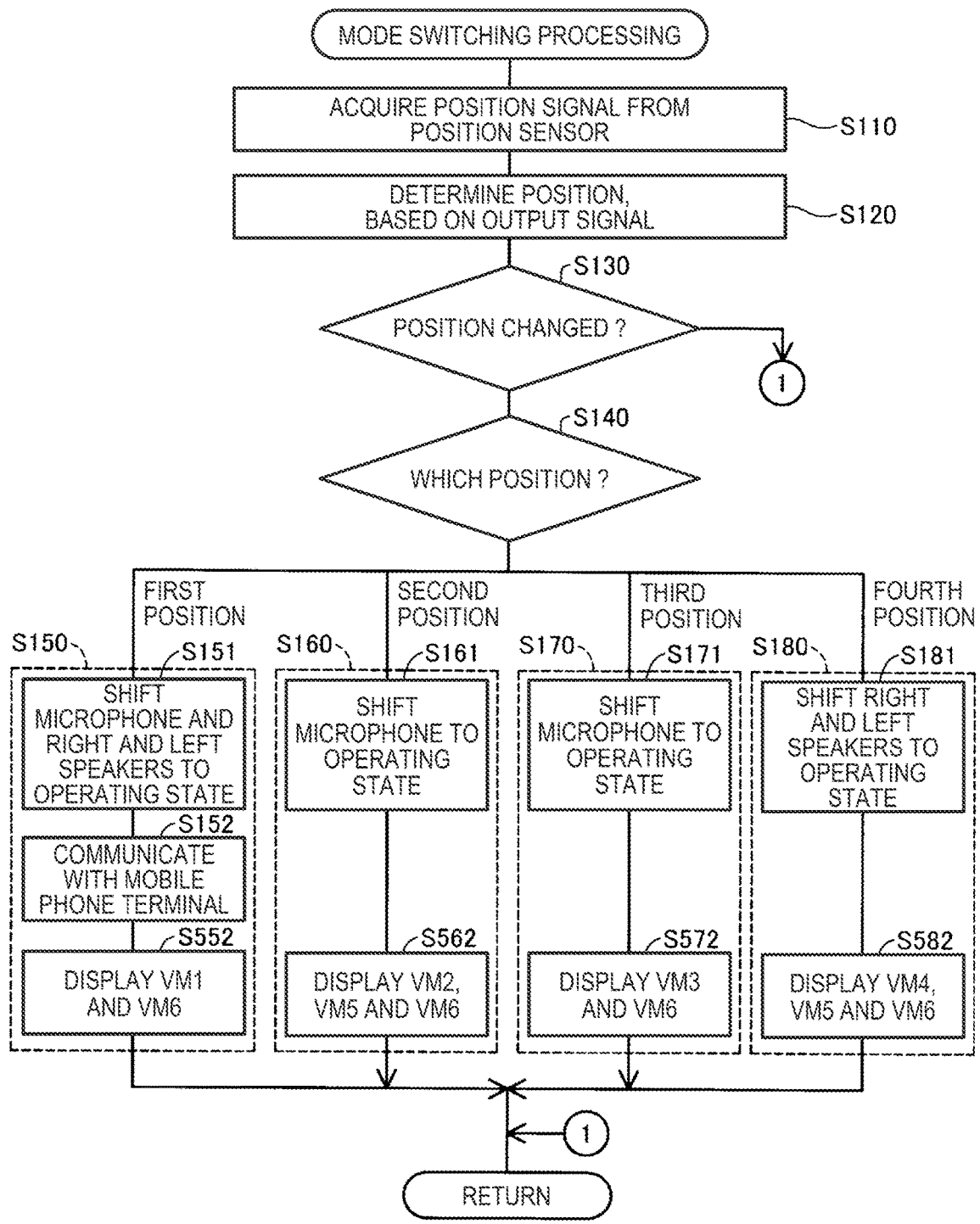
FIG. 16 is a flowchart showing mode switching processing executed in an HMD according to a fifth embodiment of the invention.

FIG. 16 is a flowchart showing mode switching processing executed in an HMD according to a fifth embodiment of the invention. The HMD of the fifth embodiment is different from the HMD 100 of the first embodiment in the content of the mode switching processing executed by the control unit of the HMD. The mode switching processing in this embodiment shown in FIG. 16 is different from the mode switching processing in the first embodiment shown in FIG. 5 only in the display processing executed in each mode and the other steps are the same. That is, the processing of Steps S552, S562, S572 and S582 in FIG. 16 is different from the first embodiment.

Moreover, while no biological sensor is provided in the first embodiment, a biological sensor is provided in this fifth embodiment. This biological sensor is the same as the biological sensor 438 described in the fourth embodiment and is provided at the same position as in the fourth embodiment. The other features are the same as in the first embodiment.

Figure 17:
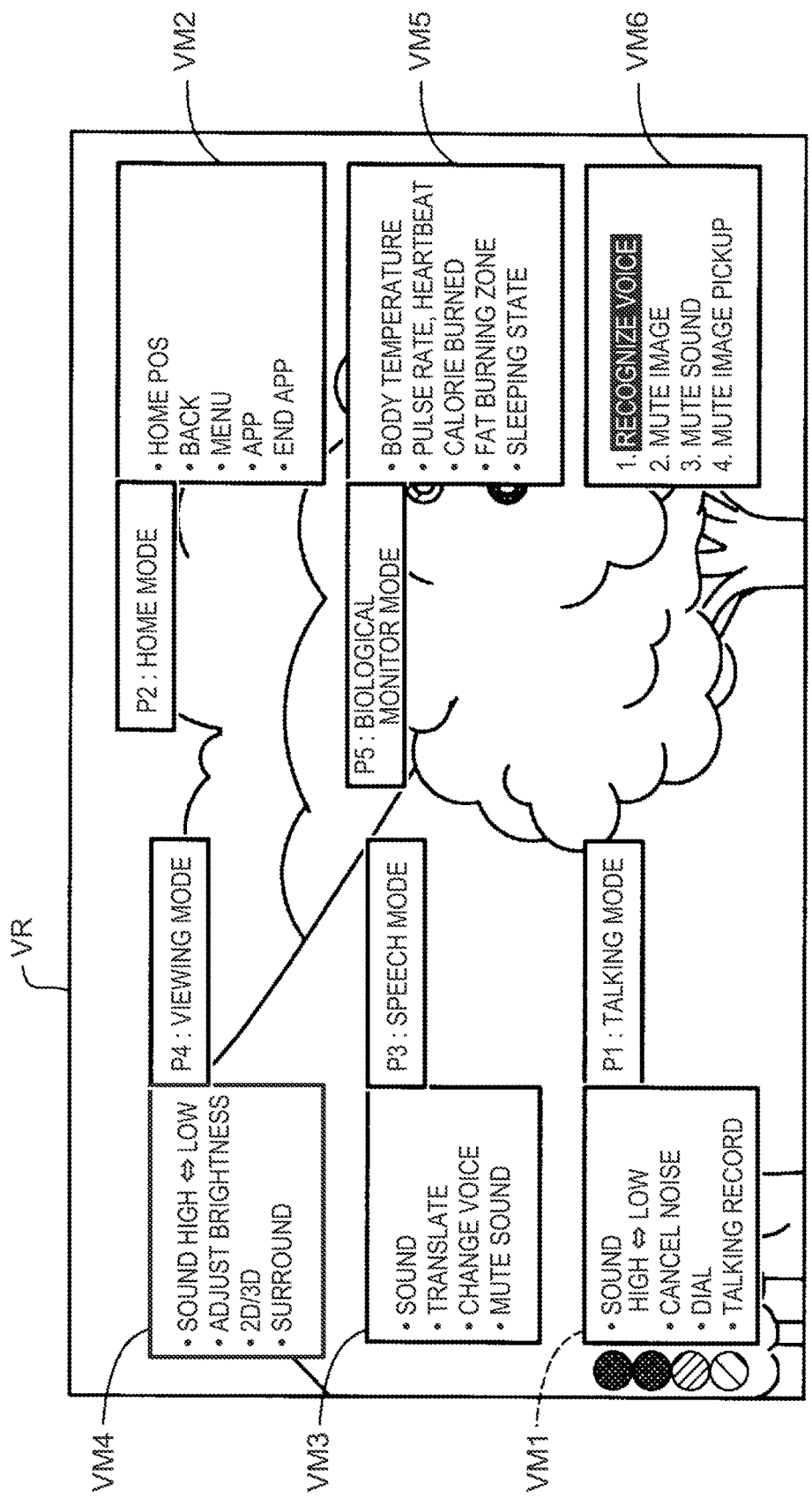
FIG. 17 is an explanatory view showing the menus displayed in Steps S552, S562, S572 and S582 of FIG. 16, on one screen.

FIG. 17 is an explanatory view showing the menus displayed in Steps S552, S562, S572 and S582, on one screen. In this embodiment, six menus are prepared in advance. A first menu VM1 is a menu for designating operations related to talking on the phone. A second menu VM2 is a menu for designating basic operations. A third menu VM3 is a menu for designating operations related to talking with the microphone 31. A fourth menu VM4 is a menu for designating operations related to viewing a movie, video or the like. A fifth menu VM5 is a menu for designating operations related to the biological sensor. According to the fifth menu VM5, each of the functions of the biological sensor can be switched on and off individually. A sixth menu VM6 is a menu for designating operations related to audio and image.

In Steps S552, S562, S572 and S582 of FIG. 16, one or a plurality of menus selected from the first to sixth menus VM1 to VM6 is displayed. Specifically, displays are shown as follows.

In Step S552 included in Step S150 of executing the talking mode, the CPU displays the first menu VM1 and the sixth menu VM6. That is, in the talking mode, the first menu VM1 related to talking on the phone and the sixth menu VM6 related to audio and image are displayed.

In Step S562 included in Step S160 of executing the home mode, the CPU displays the second menu VM2, the fifth menu VM5 and the sixth menu VM6. That is, in the home mode, the second menu VM2 related to basic operations, the fifth menu VM5 related to the biological sensor, and the sixth menu VM6 related to audio and image are displayed.

In Step S572 included in Step S170 of executing the speech mode, the CPU displays the third menu VM3 and the sixth menu VM6. That is, in the speech mode, the third menu VM3 related to talking with the microphone 31 and the sixth menu VM6 related to audio and image are displayed.

In Step S582 included in Step S180 of executing the viewing mode, the CPU displays the fourth menu VM4, the fifth menu VM5 and the sixth menu VM6. That is, in the viewing mode, the fourth menu VM4 related to viewing, the fifth menu VM5 related to the biological sensor, and the sixth menu VM6 related to audio and image are displayed.

That is, in each of the talking mode, the home mode, the speech mode and the viewing mode, one of the first to fourth menus VM1 to VM4 corresponding to each mode and the sixth menu VM6 are displayed. Also, in the modes other than the talking mode and the speech mode, that is, in the home mode and the viewing mode, the fifth menu VM5 is displayed as well.

According to the HMD of the fifth embodiment configured as described above, the operation of the microphone and the display screen on the image display unit change according to the position of the microphone, as in the first embodiment. Therefore, according to the HMD of the fifth embodiment, not only the operation using the microphone but also the display mode of the image display unit can be switched, as in the first embodiment. Particularly in this embodiment, as the display mode, the menus displayed are switched according to the mode. Therefore, operability can be improved further.

F. Modifications

The invention is not limited to the first to fifth embodiments and the modifications thereof and can be carried out in various other forms of embodiments without departing from the scope of the invention. For example, the following modifications are possible.

F-1. Modification 1

In the first embodiment, the arm 32 is coupled by the coupling part 33 in such a way as to be able to turn, thus enabling the position of the microphone 31 at the distal end of the arm 32 to be switched between the plurality of positions. In contrast, as a modification, a coupling part which does not allow the arm to turn but simply fixes the arm may be used, and the arm may be replaced with a flexible arm. The flexible arm is a rod-like member which can be curved and can maintain its shape, for example, a pleated metal member or plastic member. With the flexible arm, the position of the microphone can be switched between multiple positions. The determination on which position the microphone is located is carried out by shooting the microphone with an image pickup sensor and then detecting the direction and position of the microphone from the picked-up image. This configuration can achieve effects similar to those of the first embodiment.

F-2. Modification 2

In each of the embodiments, the number of positions which the microphone can be located is four. However, the number of positions may be three instead. For example, the first position P1, the second position P2 and the fourth position P4 shown in FIG. 4 may be used. Also, the number of positions may be two. For example, the first position P1 and the second position P2 shown in FIG. 4 may be used. Moreover, the number of positions may be greater than four. While simply turning on and off a predetermined device takes two positions, various kinds of control can be performed by employing three or more positions.

F-3. Modification 3

In the first embodiment, the position of the microphone is the relative position of the microphone to the coupling part 33 of the arm 32. In the second embodiment, the position of the microphone is the relative position of the microphone to the earpiece unit 294. That is, the relative position between the microphone and the axis on which the microphone turns is defined as the position of the microphone. However, the position of the microphone may be the position in relation to another position on the HMD. Also, a predetermined position on (for example, the mouth of) the user wearing the HMD may be defined as the position of the microphone.

F-4. Modification 4

In each of the embodiments, as the display mode is switched, the display screen is switched to a different display screen. However, instead of this, one display item may be switched to another display item on the same type of display screen. That is, the whole of the display screen may be switched, or a part of the display screen may be switched.

F-5. Modification 5

Instead of each of the embodiments, as the display mode switched by the mode switching control unit, an image showing the position of the audio input unit may be displayed. Moreover, the name of a mode (for example, talking mode, home mode and the like) decided from the position of the audio input unit may be displayed as superimposed on the actual input unit transmitted through the optical image display units 26, 28 and visually recognized. With this configuration, the operator can instantly learn which mode is on.

F-6. Modification 6

In the first embodiment, the microphone unit has a configuration in which a microphone is connected to an arm coupled to the image display unit. In the second embodiment, the microphone unit is a wireless earphone microphone. Instead of these, a wireless headset having a headphone and a microphone may be employed. The wireless headset is connected to the control unit via Bluetooth (trademark registered). Also, the microphone unit may be a wristwatch-type wearable device having an audio input unit, a ring-type wearable device having an audio input unit, and the like. These wearable devices are wirelessly connected to the control unit via Bluetooth, iBeacon, wireless LAN or the like.

F-7. Other Modifications

In the embodiments, examples of the configuration of the head-mounted display are described. However, the configuration of the head-mounted display can be arbitrarily defined without departing from the scope of the invention. For example, addition, deletion, conversion and the like of each component can be carried out.

The allocations of components to the control unit and the image display unit in the embodiments are simply examples and various other forms can be employed. For example, the following forms may be employed: (i) the control unit is equipped with the processing functions of the CPU, memory and the like, and the image display unit is equipped with the display functions only; (ii) the control unit and the image display unit are both equipped with the processing functions of the CPU, memory and the like; (iii) the control unit and the image display unit are integrated as a single unit (for example, the image display unit including the control unit functions as an eyeglasses-type wearable computer); (iv) a smartphone or portable game machine is used instead of the control unit; and (v) the control unit and the image display unit are configured to be able to communicate wirelessly with each other and wirelessly supplied with electrical power, and the connecting part (cord) is eliminated.

In the embodiments, the control unit has the transmission unit, and the image display unit has the receiving unit, as a matter of convenience of explanation. However, the transmission unit and the receiving unit in the embodiments both have a bidirectional communication ability and therefore can function as a transmission/receiving unit. Also, for example, the control unit shown in FIG. 2 is connected to the image display unit via a wired signal transmission channel. However, the control unit and the image display unit may be connected to each other via a wireless signal transmission channel such as wireless LAN, infrared communication, or Bluetooth (trademark registered).

For example, the configurations of the control unit and the image display unit described in the embodiments can be changed arbitrarily. Specifically, for example, the touch pad may be eliminated from the control unit and the control unit may be made to operate only with the D-pad. Also, the control unit may be provided with another operation interface such as an operation stick. Moreover, the control unit may be configured in such a way that devices such as a keyboard and a mouse can be connected thereto, and the control unit may accept inputs from the keyboard and the mouse. Also, for example, an operation input from a foot switch (switch operated by the user's foot) may be acquired in addition to operation inputs from the touch pad and the D-pad. For example, the image display unit may be provided with a line-of-sight detection unit such as an infrared sensor, and then the user's line of sight may be detected and an operation input by a command corresponding to the movement of the line of sight may be acquired. For example, a gesture of the user may be detected using a camera, and an operation input by a command corresponding to the gesture may be acquired. In the detection of the gesture, the user's fingertip, a ring on the user's hand, a medical instrument held by the user or the like can be used as a mark for movement detection. If operation inputs from the foot switch and the line of sight can be acquired, the input information acquisition unit can acquire an operation input from the user even when the user cannot leave his or her hands from work.

Figure 18:
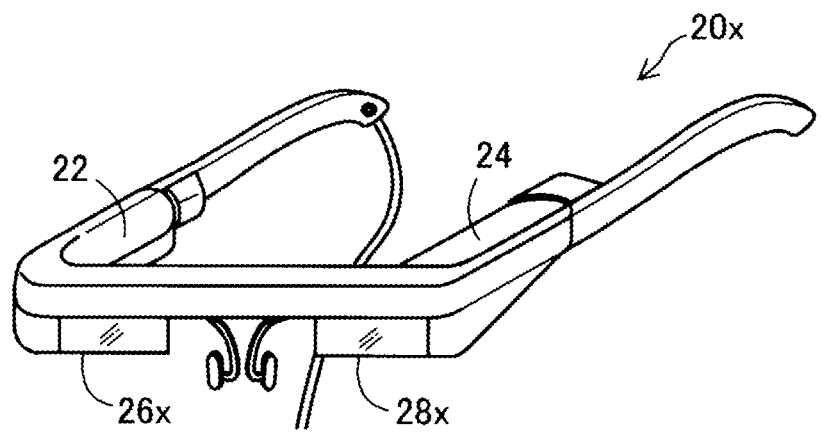
FIG. 18 is an explanatory view showing the external configuration of an HMD according to a modification.
Figure 19:
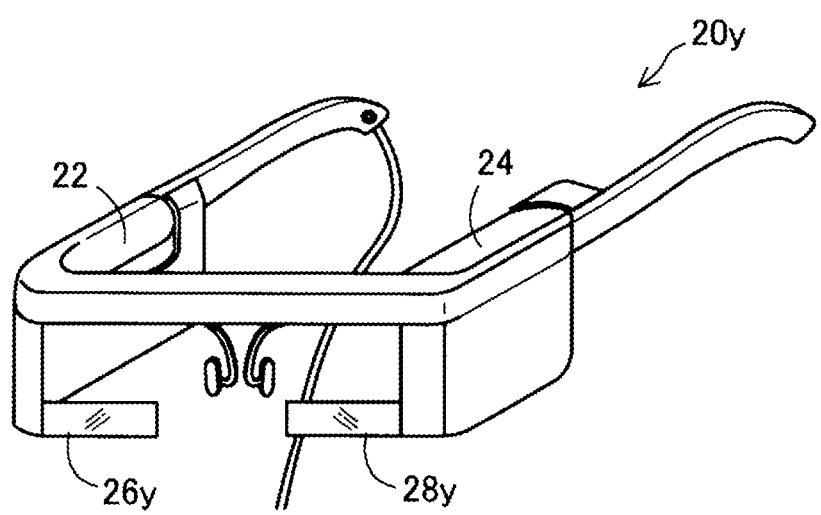
FIG. 19 is an explanatory view showing the external configuration of an HMD according to another modification.

FIGS. 18 and 19 are explanatory view showing the outer configurations of HMDs according to modifications. In the example of FIG. 18, an image display unit 20x has a right optical image display unit 26x instead of the right optical image display unit 26, and a left optical image display unit 28x instead of the left optical image display unit 28. The right optical image display unit 26x and the left optical image display unit 28x are formed to be smaller than the optical members in the embodiments and arranged obliquely above the user's right eye and left eye, respectively, when the user wears the HMD. In the example of FIG. 19, an image display unit 20y has right optical image display unit 26y instead of the right optical image display unit 26, and a left optical image display unit 28y instead of the left optical image display unit 28. The right optical image display unit 26y and the left optical image display unit 28y are formed to be smaller than the optical members in the embodiments and are arranged obliquely below the user's right eye and left eye, respectively, when the user wears the HMD. In this way, the optical image display units only have to be arranged near the user's eyes. Also, the size of the optical members forming the optical image display units may be decided arbitrarily, and the HMD can be implemented as an HMD whose optical image display units partly cover the user's eyes, that is, an HMD whose optical image display units do not completely cover the user's eyes.

For example, while the head-mounted display employed above is a binocular transmission-type head-mounted display, a monocular head-mounted display may also be employed. Also, the head-mounted display may be configured as a non-transmission-type head-mounted display which cuts off the outside scenery in the state where the user wears the head-mounted display.

The functional units such as the image processing unit, the display control unit, and the audio processing unit, for example, are described as being materialized by the CPU unfolding and executing computer programs stored in the ROM or hard disk into the RAM. However, these functional units may be configured using an ASIC (application specific integrated circuit) designed to materialize these functions.

For example, in the embodiments, the head-mounted display whose image display unit is worn like eyeglasses is described. However, the image display unit may be an ordinary flat-type display device (liquid crystal display device, plasma display device, organic EL display device, or the like). Also in this case, the connection between the control unit and the image display unit may be via a wired signal transmission channel or may be via a wireless signal transmission channel. With this configuration, the control unit can also be used as a remote controller of the ordinary flat-type display device.

As the image display unit, instead of the configuration to be worn by fastening the head band as in the first embodiment or the configuration to be worn like eyeglasses as in the second embodiment, an image display unit having another shape such as an image display unit to be worn like a hat may be employed, for example. Also, the speakers may be replaced with earphones. As the earphones, around-ear types or head band types may be employed. Also, the head-mounted display may be configured as a head-up display (HUD) installed on a vehicle such as an automobile or airplane, for example. Moreover, the head-mounted display may be configured as a head-mounted display included in a body protection tool such as a helmet, for example.

For example, in the embodiments, the display driving unit is described as using the backlight, the backlight control unit, the LCD, the LCD control unit and the projection system. However, this configuration is only an example. The display driving unit may also have a component for implementing another system, in addition to or instead of these components. For example, the display driving unit may have an organic EL (organic electro-luminescence) display, an organic EL control unit, and a projection system. For example, the display driving unit can also use a DMD (digital micromirror device) or the like instead of the LCD. For example, the display driving unit may include a signal light modulation unit including a color light source for generating each color light of RGB and a relay lens, a scanning system including a MEMS mirror, and a driving control circuit for driving these. In this way, even if the organic EL, DMD, or MEME mirror is used, the "emission area by the display driving unit" is the same area where image light is actually emitted from the display driving unit, and effects similar to those of the embodiments can be achieved by controlling the emission area by each device (display driving unit) similarly to the embodiments. Also, the display driving unit may include one or more lasers for casting a laser beam with an intensity corresponding to a pixel signal, to the user's retinas. In this case, the "emission area by the display driving unit" refers to the area where the laser beam representing the image is actually emitted from the display driving unit. Effects similar to those of the embodiments can be achieved by controlling the laser beam emission area of the laser (display driving unit) similarly to the embodiments.

The invention is not limited to the embodiments, examples and modifications described above and can be implemented with various configurations without departing from the scope of the invention. For example, the technical features described in the embodiments, examples and modifications corresponding to the technical features in the respective forms of configuration described in the section of the summary of the invention can be suitably replaced or combined according to need, in order to solve a part or all of the foregoing problems or in order to achieve a part or all of the foregoing advantageous effects. Also, the technique features can be suitably deleted according to need, unless these technical features are described as essential in this specification.

The entire disclosure of Japanese Patent Application Nos. 2015-025930, filed Feb. 13, 2015 and 2015-217555, filed Nov. 5, 2015 are expressly incorporated by reference herein.

What is claimed is:

1. A head-mounted display device including an image display unit that displays an image, the device comprising:
   a microphone unit that includes an audio input unit, which converts a sound into an electrical signal, and that is configured to facilitate the audio input unit physically moving between a plurality of predetermined positions;
   a position determination unit that determines which position of the plurality of predetermined positions the audio input unit is located at; and
   a mode switching control unit that switches an operation of the audio input unit and a display mode of the image display unit, respectively, on the basis of the determined position.

2. The head-mounted display device according to claim 1, wherein
   the image display unit is configured to allow a user to view a scene outside of the head-mounted display device together with the image displayed by the image display unit.

3. The head-mounted display device according to claim 1, further comprising an audio output unit that outputs a sound,
   wherein the mode switching control unit also switches an operation of the audio output unit on the basis of the determined position.

4. The head-mounted display device according to claim 3, wherein
   when the determined position is a position closest to a user's mouth, of the plurality of predetermined positions, the mode switching control unit switches to a talking mode in which the audio input unit and the audio output unit are each switched into an operating state so as to enable the user to talk to a third party.

5. The head-mounted display device according to claim 4, further comprising a camera that shoots at least a part of a scene that is outside of the head-mounted display device,
   wherein, when in the talking mode, the switching of the display mode of the image display unit by the mode switching control unit includes switching a display to a screen for shooting with the camera unit.

6. The head-mounted display device according to claim 4, wherein
   when the determined position is a position farthest from the user's mouth, of the plurality of predetermined positions, the mode switching control unit switches to a mode in which the audio output unit is switched into the operating state and in which a predetermined image is displayed on the image display unit.

7. The head-mounted display device according to claim 6, wherein
   when the determined position is a predetermined position between the position closest to the user's mouth and the position farthest from the user's mouth, of the plurality of predetermined positions, the mode switching control unit switches to a home mode in which the audio input unit is switched into the operating state and in which a menu screen for giving a command on an operation item corresponding to a sound acquired by the audio input unit is displayed.

8. The head-mounted display device according to claim 1, wherein
   when the position determined by the position determination unit is a predetermined position included in the plurality of predetermined positions, the mode switching control unit switches to a home mode in which the audio input unit is switched into an operating state and in which a menu screen for giving a command on an operation item corresponding to a sound acquired by the audio input unit is displayed.

9. The head-mounted display device according to claim 1, wherein
   when the position determined by the position determination unit is a predetermined position included in the plurality of predetermined positions, the mode switching control unit displays a menu screen for designating an operation related to a biological sensor.

10. The head-mounted display device according to claim 1, wherein
    the microphone unit includes the audio input unit connected to a distal end thereof and has an end opposite to the audio input unit provided with an arm connected in such a way as to be able to turn at a predetermined position on a section of the head-mounted display device that is wearable on a user's head.

11. The head-mounted display device according to claim 1, wherein
    the microphone unit includes the audio input unit connected to a distal end thereof and includes an arm that can expand and contract in a longitudinal direction.

12. The head-mounted display device according to claim 1, wherein
    the image display unit is provided in such a way as to be able to turn with respect to a section of the head-mounted display device that is wearable on a user's head, and the microphone unit is arranged at a predetermined position on the image display unit.

13. A control method for a head-mounted display device, the device including an image display unit that displays an image, and a microphone unit that includes an audio input unit, which converts a sound into an electrical signal, and that is configured to facilitate the audio input unit physically moving between a plurality of predetermined positions, the method comprising:
    determining which position of the plurality of predetermined positions the audio input unit is located at; and
    switching an operation of the audio input unit and a display mode of the image display unit, respectively, on the basis of the determined position.

14. A non-transitory computer-readable storage medium storing a computer program for controlling a head-mounted display device, the head-mounted display device including an image display unit that displays an image, and a microphone unit that includes an audio input unit, which converts a sound into an electrical signal, and that is configured to facilitate the audio input unit physically moving between a plurality of predetermined positions, the program configured to cause a computer to implement:

a function of determining which position of the plurality of predetermined positions the audio input unit is located at; and a function of switching an operation of the audio input unit and a display mode of the image display unit, respectively, on the basis of the determined position.

* * * * *